US010933492B2

(12) United States Patent
Peters et al.

(10) Patent No.: US 10,933,492 B2
(45) Date of Patent: Mar. 2, 2021

(54) SYSTEMS AND METHODS OF ADDITIVE STRUCTURAL BUILD TECHNIQUES

(71) Applicant: Lincoln Global, Inc., Santa Fe Springs, CA (US)

(72) Inventors: Steven R. Peters, Huntsburg, OH (US); Andrew R. Peters, Chesterland, OH (US); William T. Matthews, Chesterland, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 238 days.

(21) Appl. No.: 16/052,816

(22) Filed: Aug. 2, 2018

(65) Prior Publication Data

US 2019/0160530 A1    May 30, 2019

Related U.S. Application Data

(60) Provisional application No. 62/592,045, filed on Nov. 29, 2017.

(51) Int. Cl.
*B23K 9/04* (2006.01)
*B23K 26/34* (2014.01)
(Continued)

(52) U.S. Cl.
CPC .............. *B23K 26/34* (2013.01); *B22F 3/00* (2013.01); *B22F 3/008* (2013.01); *B23K 9/044* (2013.01);
(Continued)

(58) Field of Classification Search
CPC ......... B33Y 10/00; B33Y 30/00; B33Y 50/00; B33Y 50/02
See application file for complete search history.

(56) References Cited

U.S. PATENT DOCUMENTS

| 5,526,327 A | 6/1996 | Cordova, Jr. |
| 5,864,955 A | 2/1999 | Hirai |

(Continued)

FOREIGN PATENT DOCUMENTS

| CN | 203109235 U | 8/2013 |
| CN | 103802317 A | 5/2014 |

(Continued)

OTHER PUBLICATIONS

Abe, et al.; "Dissimilar metal deposition with a stainless steel and nickel-based alloy using wire and arc-based additive manufacturing;" Precision Engineering; Elsevier; vol. 45; Dated Mar. 25, 2016; pp. 387-395.

(Continued)

*Primary Examiner* — Ryan M Ochylski
(74) *Attorney, Agent, or Firm* — David J. Muzilla

(57) ABSTRACT

Embodiments of systems and methods of additive manufacturing are disclosed. In one embodiment, a metal deposition device (MDD) is configured to deposit a metal material during an additive manufacturing process. A controller is operatively coupled to the MDD and is configured to command the MDD to deposit the metal material on a base to form a contour of a part. The controller is configured to command the MDD to deposit the metal material on the base to form an infill pattern within a region outlined by the contour. The infill pattern is a wave shape having a wavelength. The controller is configured to command the metal deposition device to fuse the infill pattern to the metal contour at crossover points, where the infill pattern meets the contour, by applying energy at the crossover points and reducing a deposition rate of the metal material at the crossover points to prevent distorting the contour.

10 Claims, 21 Drawing Sheets

(51) Int. Cl.

| | |
|---|---|
| *B23K 26/354* | (2014.01) |
| *B33Y 40/00* | (2020.01) |
| *B33Y 30/00* | (2015.01) |
| *B33Y 10/00* | (2015.01) |
| *B23K 26/342* | (2014.01) |
| *B29C 64/00* | (2017.01) |
| *B22F 3/00* | (2021.01) |
| *B23K 9/32* | (2006.01) |
| *B28B 1/00* | (2006.01) |
| *B23K 103/00* | (2006.01) |
| *B23K 103/02* | (2006.01) |

(52) U.S. Cl.
CPC ............ *B23K 9/324* (2013.01); *B23K 26/342* (2015.10); *B23K 26/354* (2015.10); *B28B 1/001* (2013.01); *B29C 64/00* (2017.08); *B33Y 10/00* (2014.12); *B33Y 30/00* (2014.12); *B33Y 40/00* (2014.12); *B23K 2103/02* (2018.08); *B23K 2103/52* (2018.08)

(56) References Cited

U.S. PATENT DOCUMENTS

| | | | |
|---|---|---|---|
| 5,940,037 | A | 8/1999 | Kellerman et al. |
| 6,144,008 | A | 11/2000 | Rabinovich |
| 7,704,565 | B2 | 4/2010 | Slaughter |
| 9,011,136 | B1 | 4/2015 | Uzan et al. |
| 9,162,305 | B2 | 10/2015 | Brass et al. |
| 9,266,181 | B2 | 2/2016 | Flagg et al. |
| 9,352,413 | B2 | 5/2016 | Bruck et al. |
| 9,833,862 | B2 | 12/2017 | Denney et al. |
| 2012/0325779 | A1 | 12/2012 | Yelistratov |
| 2015/0014885 | A1 | 1/2015 | Hofmann et al. |
| 2015/0021815 | A1 | 1/2015 | Albrecht et al. |
| 2015/0044084 | A1 | 2/2015 | Hofmann et al. |
| 2015/0209905 | A1 | 7/2015 | Matthews et al. |
| 2015/0321295 | A1 | 11/2015 | Van Der Mee et al. |
| 2015/0352770 | A1 | 12/2015 | Busenbecker |
| 2016/0032766 | A1 | 2/2016 | Bunker et al. |
| 2016/0251736 | A1 | 9/2016 | Shimizu |
| 2017/0066083 | A1 | 3/2017 | Shioya et al. |
| 2017/0326690 | A1 | 11/2017 | Heard et al. |
| 2018/0085995 | A1 | 3/2018 | Davis |
| 2018/0345650 | A1* | 12/2018 | Chisena ............... B33Y 30/00 |

FOREIGN PATENT DOCUMENTS

| | | |
|---|---|---|
| DE | 10 2007 056259 A1 | 6/2009 |
| DE | 10 2010 025950 A1 | 1/2012 |
| EP | 2 498 935 A1 | 9/2012 |
| EP | 2 555 902 A1 | 2/2013 |
| EP | 3 213 863 A1 | 9/2017 |
| GB | 1 239 587 A | 7/1971 |
| WO | 2013/112217 A2 | 8/2013 |
| WO | 2016/019434 A1 | 2/2016 |

OTHER PUBLICATIONS

Bayode, et al.; "Effect of Scanning Speed on Laser Deposited 17-4PH Stainless Steel;" 8th International Conference on Mechanical and Intelligent Manufacturing Technologies (ICMIMT); IEEE; Dated Feb. 3, 2017; pp. 1-5.

Extended European Search Report from Corresponding Application No. 18209304.7; dated Mar. 14, 2019; pp. 1-15.

Extended European Search Report from Corresponding Application No. 18209097.7; dated Mar. 13, 2019; pp. 1-12.

Cyr, et al.; "Fracture behaviour of additively manufactured MS1-H13 hybrid hard steels;" Materials Letters; Elsevier; vol. 212; dated Oct. 21, 2017; pp. 174-177.

Baek, et al.; "Mechanical Characteristics of a Tool Steel Layer Deposited by Using Direct Energy Deposition;" Metals and Materials International, Korean Institute of Metals and Materials; vol. 23, No. 4; Dated Jul. 12, 2017; pp. 770-777.

Extended European Search Report from Corresponding Application No. 18209292.4; dated Mar. 18, 2019; pp. 1-15.

Extended European Search Report from Corresponding Application No. 18209284.1; dated May 9, 2019; pp. 1-11.

Partial European Search Report from Corresponding Application No. 18209270.0-1016; dated May 24, 2019; pp. 1-14.

Extended European Search Report from Corresponding Application No. 18209298.1-1016; dated Jun. 21, 2019; pp. 1-9.

Akuula; "Hybrid adaptive layer manufacturing: An Intelligent art of direct metal rapid tooling process"; Robotics and Computer-Integrated Manufacturing; vol. 22; Published 2006; pp. 113-123.

America Makes; "4062 Multi-Source/Feedstock/Meter-Scale Metal AM Machine"; https://www.americamakes.us/portfolio/4062-multi-sourcefeedstockmeter-scale-metal-machine/; May 17, 2018; pp. 1-3.

\* cited by examiner

SYSTEMS AND METHODS OF ADDITIVE STRUCTURAL BUILD TECHNIQUES

CROSS REFERENCE TO RELATED APPLICATIONS/INCORPORATION BY REFERENCE

This U.S. Patent Application claims priority to and the benefit of U.S. Provisional Patent Application Ser. No. 62/592,045, filed on Nov. 29, 2017, the disclosure of which is incorporated herein by reference in its entirety.

FIELD

Embodiments of the present invention relate to systems and methods related to additive manufacturing, and more specifically to additive manufacturing structural build techniques.

BACKGROUND

Conventionally, additive manufacturing processes are able to make near net shape parts at relatively low deposition rates where each part is built up layer-by-layer. However, build times can be long, and present build techniques can be inadequate for additively manufacturing certain types of parts (e.g., tools).

SUMMARY

Embodiments of the present invention include systems and methods related to additive manufacturing that enable structural build techniques for improving the time and efficiency of additively manufacturing a three-dimensional (3D) part and for improving the resultant performance and quality of the part. In one embodiment, an additive manufacturing system is provided. Patterns of multiple layers of a 3D part to be additively manufactured are represented and stored as digital data within the system, in accordance with one embodiment. The digital data may be from a CAD model or from a scanned part, for example. The system includes a metal deposition device configured to deposit a metal material during an additive manufacturing process to form a part. The system also includes a controller operatively coupled to the metal deposition device. The controller is configured to command the metal deposition device to deposit the metal material on a base during a contour deposition phase of the additive manufacturing process to form a contour of the part. The controller is also configured to command the metal deposition device to deposit the metal material on the base during an infill pattern deposition phase of the additive manufacturing process to form an infill pattern within a region outlined by the contour of the part. In one embodiment, a deposition rate of the contour deposition phase is less than a deposition rate of the infill pattern deposition phase. The infill pattern is a wave shape having a wavelength. The wave shape may be one of, for example, a substantially sinusoidal shape, a substantially triangular shape, or a substantially rectangular shape. In one embodiment, the controller is configured to adjust the wavelength of the wave shape to adjust an infill percentage of the part. Furthermore, during the infill pattern deposition phase, the controller is configured to command the metal deposition device to fuse the metal material of the infill pattern to the metal material of the contour at crossover points, where the infill pattern meets the contour, by applying energy at the crossover points and reducing a deposition rate of the metal material at the crossover points to prevent distorting the contour. In one embodiment, the system includes a robot that is configured to be controlled by the controller during the additive manufacturing process to move the metal deposition device relative to the base. In one embodiment, the system includes a robot that is configured to be controlled by the controller during the additive manufacturing process to move the base relative to the metal deposition device. In one embodiment, the metal deposition device includes a wire feeder configured to feed a filler wire of the metal material toward the base, a power source, and a laser operatively connected to the power source. The power source and the laser are configured to provide energy to melt at least the filler wire during the additive manufacturing process. The controller is operatively connected to the wire feeder and is configured to reduce a rate of feeding of the filler wire at the crossover points, or stop feeding of the filler wire at the crossover points. In one embodiment, the metal deposition device includes a wire feeder configured to feed a filler wire of the metal material toward the base, a power source, and a non-consumable electrode operatively connected to the power source. The power source and the non-consumable electrode are configured to provide energy to melt at least the filler wire during the additive manufacturing process by forming an arc between the non-consumable electrode and the base. The controller is operatively connected to the wire feeder and is configured to reduce a rate of feeding of the filler wire at the crossover points, or stop feeding of the filler wire at the crossover points. In one embodiment, the metal deposition device includes a first wire feeder configured to feed a filler wire of the metal material toward the base, a power source, and a second wire feeder operatively connected to the power source and configured to feed a consumable wire electrode of the metal material toward the base. The power source is configured to provide energy to melt at least the consumable wire electrode and the filler wire during the additive manufacturing process by forming an arc between the consumable wire electrode and the base. The controller is operatively connected to the first wire feeder and is configured to reduce a rate of feeding of the filler wire at the crossover points, or stop feeding of the filler wire at the crossover points. In one embodiment, the metal deposition device includes a wire feeder configured to feed a consumable wire electrode of the metal material toward the base, and a power source operatively connected to the wire feeder. The power source is configured to provide energy to melt at least the consumable wire electrode during the additive manufacturing process by forming an arc between the consumable wire electrode and the base. The controller is operatively connected to the wire feeder and the power source and is configured to reduce a rate of feeding of the consumable wire electrode at the crossover points and/or reduce the energy provided by the power source to the consumable wire electrode at the crossover points.

One embodiment includes an additive manufacturing system. The system includes a metal deposition device configured to deposit a metal material during an additive manufacturing process to form a part. The system also includes a support wire positioning device configured to position a metal support wire during the additive manufacturing process to support at least a portion of the part. The system further includes a controller operatively coupled to the metal deposition device and the support wire positioning device. The controller is configured to command the support wire positioning device to weld a first end of the metal support wire to a first location on a base upon which the part is to be additively manufactured and position a second end of the metal support wire at a designated support point in space. The controller is also configured to command the metal deposition device to deposit the metal material on the second end of the metal support wire during the additive manufacturing process to form at least a portion of the part supported by the metal support wire. In one embodiment, the support wire positioning device uses at least one of a laser hot-wire (LHW) process, a gas metal arc welding (GMAW) process, a gas tungsten arc welding (GTAW) process, a flux-cored arc welding (FCAW) process, an electron beam welding (EBW) process, or an electric resistance welding (ERW) process to weld the first end of the metal support wire to the first location on the base. In one embodiment, the support wire positioning device includes a power source and a wire elongation device to position the second end of the metal support wire at the designated support point. The power source is configured to heat the metal support wire to an extruding temperature or a drawing temperature by passing an electric current through the metal support wire. The wire elongation device is configured to extrude or draw the metal support wire in a direction toward the designated support point. In one embodiment, the support wire positioning device includes a wire feeder and a wire cutter to position the second end of the metal support wire at the designated support point. The wire feeder is configured to back-feed the metal support wire from the first location on the base to at least the designated support point. The wire cutter is configured to cut the metal support wire at the designated support point to form the second end of the metal support wire. In one embodiment, the metal deposition device uses at least one of a laser hot-wire (LHW) process, a gas metal arc welding (GMAW) process, a gas tungsten arc welding (GTAW) process, a flux-cored arc welding (FCAW) process, an electron beam welding (EBW) process, or an electric resistance welding (ERW) process to deposit the metal material during the additive manufacturing process to form the part. In one embodiment, the system includes at least one robot that is configured to be controlled by the controller during the additive manufacturing process to move the metal deposition device and the support wire positioning device relative to the base. In one embodiment, the system includes at least one robot that is configured to be controlled by the controller during the additive manufacturing process to move the base relative to the metal deposition device and the support wire positioning device.

One embodiment includes an additive manufacturing system. The system includes a ceramic deposition device configured to deposit a ceramic material during an additive manufacturing process. The system also includes a metal deposition device configured to deposit a metal material during the additive manufacturing process. The system further includes a controller operatively coupled to the ceramic deposition device and the metal deposition device. The controller is configured to command the ceramic deposition device to deposit the ceramic material on a base during an infill deposition phase of the additive manufacturing process to form a ceramic infill portion of a part. The controller is also configured to command the metal deposition device to deposit the metal material on at least one surface of the ceramic infill portion of the part during a metal shell deposition phase of the additive manufacturing process to form a metal shell portion of the part. The ceramic infill portion of the part may be electrically conductive, in one embodiment, and has thermal characteristics that enable the ceramic infill portion of the part to withstand temperatures produced during the metal shell deposition phase so as not to damage or distort the ceramic infill portion of the part. In one embodiment, the ceramic infill portion of the part and the metal shell portion of the part are permanent portions of the part. In one embodiment, the metal shell portion of the part is a permanent portion of the part and the ceramic infill portion of the part is a temporary portion of the part acting as a support structure for the metal shell portion of the part during the additive manufacturing process. The ceramic infill portion of the part is configured to be removed from the part to form a final version of the part. In one embodiment, the metal deposition device uses at least one of a laser hot-wire (LHW) process, a gas metal arc welding (GMAW) process, a gas tungsten arc welding (GTAW) process, a flux-cored arc welding (FCAW) process, an electron beam welding (EBW) process, or an electric resistance welding (ERW) process to deposit the metal material during the metal shell deposition phase of the additive manufacturing process. In one embodiment, the system includes at least one robot that is configured to be controlled by the controller during the additive manufacturing process to move the ceramic deposition device and the metal deposition device relative to the base. In one embodiment, the system includes at least one robot that is configured to be controlled by the controller during the additive manufacturing process to move the base relative to the ceramic deposition device and the metal deposition device.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
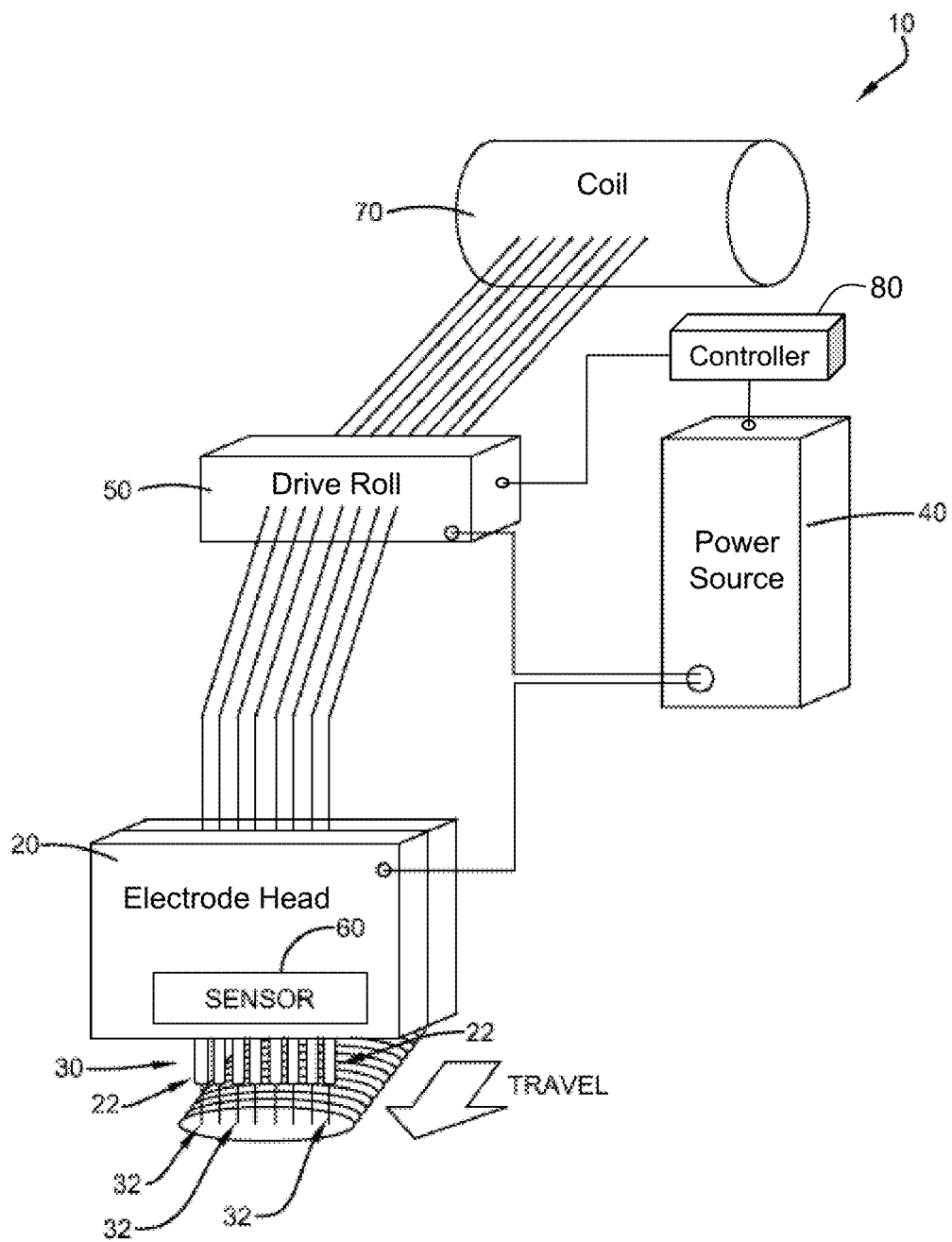
FIG. 1 illustrates a first embodiment a metal deposition device of an additive manufacturing system configured to deposit metal wire during an additive manufacturing process.

As is generally known, additive manufacturing is a process in which a material is deposited onto a base/substrate or part (e.g., in layers) so as to create a desired manufactured product. Patterns of multiple layers of a three-dimensional (3D) part to be additively manufactured are represented and stored as digital data, in accordance with one embodiment. The digital data may be from a CAD model or from a scanned part, for example. In some applications the article of manufacture can be quite complex. However, known methods and systems used for additive manufacturing tend to be slow and have limited performance. Embodiments of the present invention address those areas by providing systems and methods that enable structural build techniques for improving the time and efficiency of additively manufacturing a three-dimensional (3D) part and for improving the resultant performance and quality of the part.

Embodiments of additive manufacturing systems and methods are disclosed. In one embodiment, an additive manufacturing system includes a metal deposition device (MDD) configured to deposit a metal material during an additive manufacturing process. A controller is operatively coupled to the MDD and is configured to command the MDD to deposit the metal material on a base to form a contour of a part. The controller is configured to command the MDD to deposit the metal material on the base to form an infill pattern within a region outlined by the contour. The infill pattern is a wave shape having a wavelength. The controller is configured to command the metal deposition device to fuse the infill pattern to the metal contour at crossover points, where the infill pattern meets the contour, by applying energy at the crossover points without depositing amounts of the metal material that would result in distorting the contour.

Embodiments of a metal deposition device may include, for example, at least one of a laser-based subsystem, a plasma based subsystem, an arc based subsystem, an electron beam based subsystem, or an electric resistance based subsystem to, for example, deposit a metal material by melting a metal wire. Furthermore, some embodiments of a metal deposition device may include, for example, a wire delivery or feeding system to feed/deliver a consumable metal wire to additively manufacture a 3D part on a base. Also, some embodiments of a metal deposition device may include, for example, kinematic control elements (e.g., robotics) or other types of control elements (e.g., optical control elements) to move a laser beam, a plasma beam, an electric arc, an electron beam, or a consumable metal wire with respect to a 3D part being additively manufactured on a base or substrate.

Embodiments of the additive manufacturing systems are configured to implement additive manufacturing methods. The additive manufacturing methods provide for the creation of layers of a 3D part to be additively manufactured by controlling the deposition of metal material and/or ceramic material, and/or controlling the positioning of metal support wires to form, for example, contours and infill patterns as described in more detail later herein. The processes of depositing metal material, ceramic material, and/or positioning metal support wires can be independently controlled and may be operationally decoupled from each other (e.g., decoupled in space and/or time), in accordance with some embodiments, to provide flexibility and efficiency in additively manufacturing a 3D part.

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 illustrates an embodiment of a first type of a metal deposition device of an additive manufacturing system configured to deposit metal wire during an additive manufacturing process. It is envisioned that the metal deposition device may typically be used to help additively manufacture a part, layer-by-layer, by a welding process such as, for example, gas metal arc welding (GMAW), flux-cored arc welding (FCAW), or gas tungsten arc welding (GTAW). Other metal deposition processes are possible as well, in accordance with other embodiments.

As illustrated in FIG. 1, the metal deposition device 10 includes an electrode head 20, wherein the electrode head 20 concurrently houses an array 30 of multiple electrodes 32 (e.g. consumable welding electrodes/wires). It is to be appreciated that the multiple electrodes 32 can be continuously fed, periodically fed, or fed based on a predetermined order. The electrodes 32 may be gas-shielded, self-shielded, or metal cored. These electrodes may be solid core, metal core, or flux cored wires, to be used under gas shielding. In the instance of cored electrodes, it is contemplated that the electrode sheath may be, for example, carbon steel, stainless steel, or a nickel alloy. The electrode head 20 houses the array 30 such that electrodes 32 are in a spaced apart configuration for controllably depositing material as part of forming a layer of a 3D part (e.g., by depositing molten metal wire material on a base surface of an associated workpiece or a previous layer of a 3D part being manufactured). It is to be appreciated and understood that the electrode head 20 can be any suitable electrode head that houses the array 30 to deliver the electrodes 32. For example, the electrode head 20 can be an assembly that utilizes individual contact tips for the array 30 or a contact assembly that universally houses and encases the electrode array 30. The coil 70 may include a plurality of individual coils, each coil containing a single electrode (e.g., a welding wire), which are arranged along a common axis of rotation. Still any manner of delivering filler wire or additive material may be chosen without departing from the intended scope of coverage of the embodiments of the subject disclosure. For example, in one embodiment, the electrode head 20 is configured to provide a single consumable metal wire instead of an array of wires.

In one embodiment, as illustrated in FIG. 1, electrode head 20 is adapted to receive the array 30 of associated multiple fed electrodes 32. The metal deposition device 10 includes means for driving the array 30 of electrodes 32 through the electrode head 20. It is envisioned that the means for driving includes a plurality of drive rolls 50 or other wire feeder device. Each of the plurality of drive rolls 50 may be associated with one or more of the electrodes 32. In one aspect, two electrodes 32 may be associated with a single set of drive rolls 50, although it is envisioned that the relationship between the number of electrodes and the number of wire feeders may be configured such that any number of electrodes may be associated with a single set of drive rolls as appropriate in an additive manufacturing process. In another embodiment, each electrode can be driven by a respective drive roll 50. Still, other relationships between drive roll 50 and one or more electrodes may be employed with sound engineering judgment.

In one example embodiment, the drive rolls 50 may be configured to drive the electrodes 32 through the electrode head 20 at a rate (e.g., a wire feed speed). In one embodiment, the electrodes 32 can be driven at substantially the same rate. In another embodiment, each electrode 32 can be driven at a respective rate that can be predetermined or dynamically identified during an additive manufacturing procedure. For instance, a rate (e.g., a wire feed speed) for one or more electrodes 32 can be predetermined based on material composition, type of weld, welding parameters, workpiece/substrate, among others. In another embodiment, a rate for one or more electrodes can be dynamically identified during the additive manufacturing process based upon criteria such as, but not limited to, user input, feedback, voltage, current, and temperature, among others.

In one aspect of the embodiments of the subject invention, each of the electrodes 32 is configured to be connected to a welding power source 40. That is to say that during the additive manufacturing process, for instance, welding power can be delivered through each of the electrodes 32 in the array 30. As indicated above, power may be delivered from the welding power source 40 through welding cables (not shown) as attached at one end to studs (not shown). At the distal end, welding cables may be connected to the electrode head 20 through an electrode head connector. In the exemplary case of a single welding power source 40, a single electrode head connector may convey power from the welding cables commonly to the electrode head 20. Still, other means for conveying power from the welding cables to the electrode head 20 may be employed with sound engineering judgment. The power source 40 supplies electrical power for establishing a welding arc between each of the associated multiple fed electrodes and the associated base/substrate or part 51 (see FIG. 2). In particular, one or more power sources 40 can supply power to one or more electrodes 32 of the array 30 based on a predetermined order, for example.

Furthermore, an establishment of a welding arc between an electrode 32 and the base/substrate or part 51 can be provided by at least one of the power source 40 (e.g., supplying power, not supplying power, terminating power supply, and the like) or drive roll(s) 50 (e.g., driving electrode(s), not driving electrode(s), terminating drive of electrode, and the like). Thus, the electrodes 32 in the array 30 can be activated or deactivated based on a predetermined order, wherein the activation and/or deactivation can be based on the power source 40 and/or drive roll(s) 50. In one embodiment, controlled establishment of welding arcs to the electrodes 32 and/or controlled drive to the electrodes 32 is provided for additive manufacturing processes. As such, individual electrodes can be effectively "turned on" or "turned off" to enable the creation of contoured 2D shapes within a layer of the 3D part.

In a particular embodiment, a sensor 60 is configured to detect at least one of a location of the electrode head 20 on the base/substrate or part 51, an alignment of at least one electrode 32 of the array 30 compared to the base/substrate or part 51, or a nonalignment of at least one electrode 32 of the array 30 compared to the base/substrate or part 51. The sensor 60 can be coupled or affixed to the electrode head 20 at a location in order to detect a location of at least one electrode 32 in reference to the base/substrate or part 51. In another embodiment, a plurality of sensors 60 can be used. For example, a sensor can be used for each electrode 32. By way of example and not limitation, the sensor 60 can be an infrared (IR) sensor or a proximity sensor, among others. The sensor 60 detects alignment and/or nonalignment of at least one electrode 32 with respect to at least a portion of the base/substrate or part 51.

In accordance with one embodiment, the metal deposition device 10 includes a controller 80 which controls the power source 40, the drive roll 50, and the electrode head 20. For example, the controller 80 controls the operating characteristics (output voltage, output current, output waveform, etc.) of the electrical power of the power source 40. The controller 80 also controls the operating characteristics of the drive roll 50 (e.g., wire feed speed and arc establishment for each electrode 32 in the array 30). Furthermore, the controller 80 controls the operating characteristics of the electrode head 20 (e.g., position, travel speed, etc.). In accordance with one embodiment, the controller 80 may be integrated into the power source 40. Patterns of multiple layers of a 3D part to be additively manufactured are represented and stored as digital data within the controller 80, in accordance with one embodiment. The digital data may be from a CAD model or from a scanned part, for example.

Figure 2:
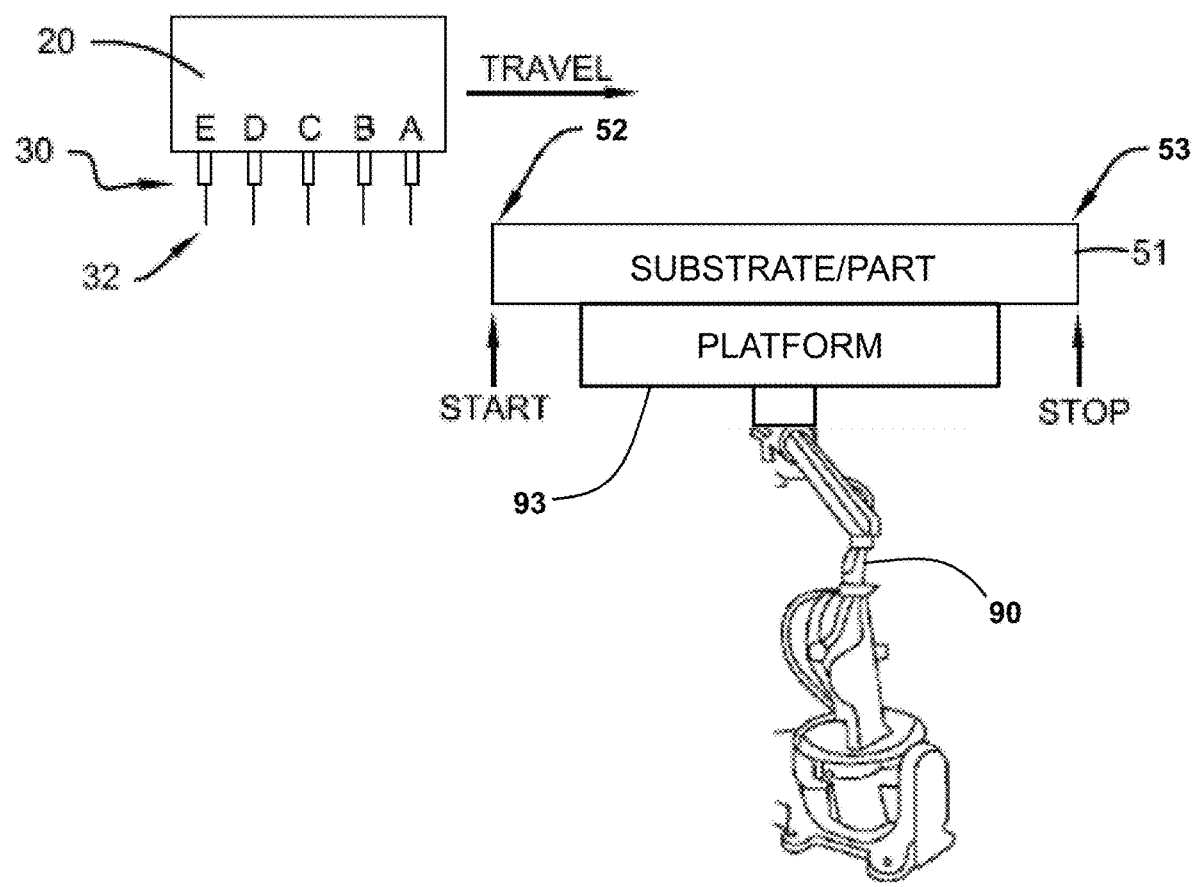
FIG. 2 illustrates an embodiment of an electrode head having multiple electrodes in an array that are configured to deposit material onto a workpiece base or a part.

Referring to FIG. 2 the electrode head 20, having five (5) electrodes 32 in the array 30, can deposit material onto the base/substrate or part 51 in a controlled direction of travel. A platform 93 and a robot 90 may be used in an additive manufacturing system to rotate and/or translate the base/substrate or part 51, as controlled by the controller 80, in accordance with one embodiment. In an alternative embodiment, motion of the electrode head 20 may be similarly controlled by the controller 80 to rotate and/or translate the electrode head 20.

Figure 3:
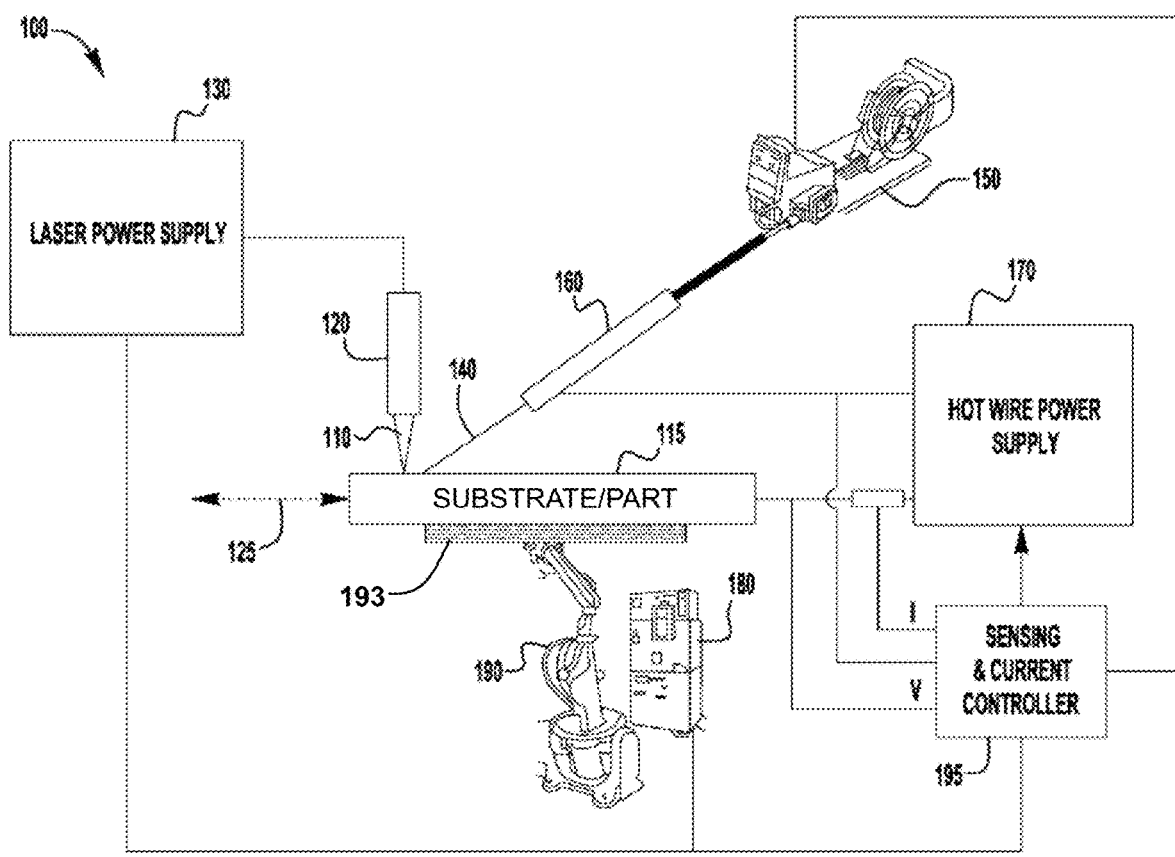
FIG. 3 illustrates a second embodiment of a metal deposition device of an additive manufacturing system configured as a laser hot wire (LHW) apparatus.

FIG. 3 shows an example of another type of a metal deposition device using a laser and a filler wire. In particular, FIG. 3 illustrates a functional schematic block diagram of an embodiment of a laser hot wire (LHW) metal deposition device 100 of an additive manufacturing system (i.e., a metal deposition device for performing additive manufacturing). The metal deposition device 100 of FIG. 3 includes an exemplary embodiment of a combination filler wire feeder and an energy source. In particular, the metal deposition device 100 includes a laser subsystem capable of focusing a laser beam 110 onto a base/substrate or part 115 to heat the base/substrate or part 115. In one embodiment, the laser subsystem is a high intensity energy source. The laser subsystem can be any type of high energy laser source, including but not limited to carbon dioxide, Nd:YAG, Yb-disk, YB-fiber, fiber delivered, or direct diode laser systems. In another embodiment, the laser subsystem is a low intensity energy source (e.g., to soften or minimally melt a metal material). Other embodiments of the metal deposition device may include, for example, at least one of an electron beam subsystem, a plasma arc welding subsystem, a gas tungsten arc welding subsystem, a gas metal arc welding subsystem, a flux cored arc welding subsystem, or a submerged arc welding subsystem serving as the energy source.

The following will repeatedly refer to the laser system, the beam, and the power supply. However, it should be understood that this reference is exemplary, as any energy source may be used. For example, a high intensity energy source can provide at least 500 W/cm$^2$. The laser subsystem includes a laser device 120 and a laser power supply 130 operatively connected to each other. The laser power supply 130 provides power to operate the laser device 120.

In one embodiment, the metal deposition device 100 also includes a hot filler wire feeder subsystem capable of providing at least one resistive filler wire 140 to make contact with the base/substrate or part 115 in the vicinity of the laser beam 110. The wire feeder subsystem includes a filler wire feeder 150, a contact tube 160, and a power supply 170. During operation, the filler wire 140 is resistance-heated by electrical current from the power supply 170 which is operatively connected between the contact tube 160 and the base/substrate or part 115. In accordance with one embodiment, the power supply 170 is a pulsed direct current (DC) power supply, although alternating current (AC) or other types of power supplies are possible as well. The wire 140 is fed from the filler wire feeder 150 through the contact tube 160 toward the base/substrate or part 115 and extends beyond the tube 160. The extension portion of the wire 140 is resistance-heated such that the extension portion approaches or reaches the melting point before contacting the base/substrate or part 115. The laser beam 110 may serve to melt some of the base metal of the base/substrate or part 115 to form a puddle and/or can also be used to melt the wire 140 onto the base/substrate or part 115. The power supply 170 provides energy needed to resistance-melt the filler wire 140. In some embodiments the power supply 170 provides all of the energy needed while in other embodiments the laser or other energy heat source can provide some of the energy. The feeder subsystem may be capable of simultaneously providing one or more wires, in accordance with certain other embodiments of the present invention.

The metal deposition device 100 further includes a motion control subsystem capable of moving the laser beam 110 (energy source) and the resistive filler wire 140 in a same controlled direction 125 along the base/substrate or part 115 (at least in a relative sense) such that the laser beam 110 and the resistive filler wire 140 remain in a fixed relation to each other. According to various embodiments, the relative motion between the base/substrate or part 115 and the laser/wire combination may be achieved by actually moving the base/substrate or part 115 or by moving the laser device 120 and the wire feeder subsystem.

In FIG. 3, the motion control subsystem includes a motion controller 180 operatively connected to a robot 190 having a platform 193 (e.g., a rotatable platform and/or a translatable platform). The motion controller 180 controls the motion of the robot 190. The robot 190 is operatively connected (e.g., mechanically secured) to the base/substrate or part 115 via the platform 193 to move the base/substrate or part 115 in, for example, a present direction of travel 125 such that the laser beam 110 and the wire 140 effectively travel along the base/substrate or part 115. In accordance with an alternative embodiment of the present invention, the laser device 120 and the contact tube 160 may be integrated into a single head. The head may be moved along the base/substrate or part 115 via a motion control subsystem operatively connected to the head. In accordance with one embodiment, the motion control subsystem, including the motion controller 180 and the robot 190 are a separate part of an additive manufacturing system and are not part of the metal deposition device.

In general, there are several methods in which an energy source/wire of a metal deposition device may be moved relative to a base/substrate or part. If the base/substrate or part is round, for example, the energy source/wire may be stationary and the base/substrate or part may be rotated under the energy source/wire. Alternatively, a robot arm or linear tractor may move parallel to the round base/substrate or part and, as the base/substrate or part is rotated, the energy source/wire may move continuously or index once per revolution to, for example, overlay the surface of the round base/substrate or part. If the base/substrate or part is flat or at least not round, the base/substrate or part may be moved under the energy source/wire as shown in FIG. 3. However, a robot arm or linear tractor or even a beam-mounted carriage may be used to move the energy source/wire head relative to the base/substrate or part. The robot 190 driving the platform 193 may be driven electrically, pneumatically, or hydraulically, in accordance with various embodiments.

The metal deposition device 100 further includes a sensing and current control subsystem 195 which is operatively connected to the base/substrate or part 115 and the contact tube 160 (i.e., effectively connected to the output of the power supply 170) and is capable of measuring a potential difference (i.e., a voltage V) between and a current (I) through the base/substrate or part 115 and the wire 140. The sensing and current control subsystem 195 may further be capable of calculating a resistance value (R=V/I) and/or a power value (P=V*I) from the measured voltage and current. In general, when the wire 140 is in contact with the base/substrate or part 115, the potential difference between the wire 140 and the base/substrate or part 115 is zero volts or very nearly zero volts. As a result, the sensing and current control subsystem 195 is capable of sensing when the resistive filler wire 140 is in contact with the base/substrate or part 115 and is operatively connected to the power supply 170 to be further capable of controlling the flow of current through the resistive filler wire 140 in response to the sensing. In accordance with another embodiment, the sensing and current controller 195 may be an integral part of the power supply 170.

As such, a metal deposition device 10 and a second metal deposition device 100 have been described herein. The metal deposition devices 10 and 100 may be used separately or in combination (e.g., as subsystems to form a larger additive manufacturing system) to perform additive manufacturing operations as described herein. Other types of metal deposition devices may be used in an additive manufacturing system based on the requirements of the additive manufacturing processes described herein. For example, various types of metal deposition devices may be, for example, laser-based, plasma based, arc based, electron beam based, Joule-heating based, or some combination thereof. Such metal deposition devices may be used to perform additive manufacturing methods to deposit metal material as described next herein.

Figure 4:
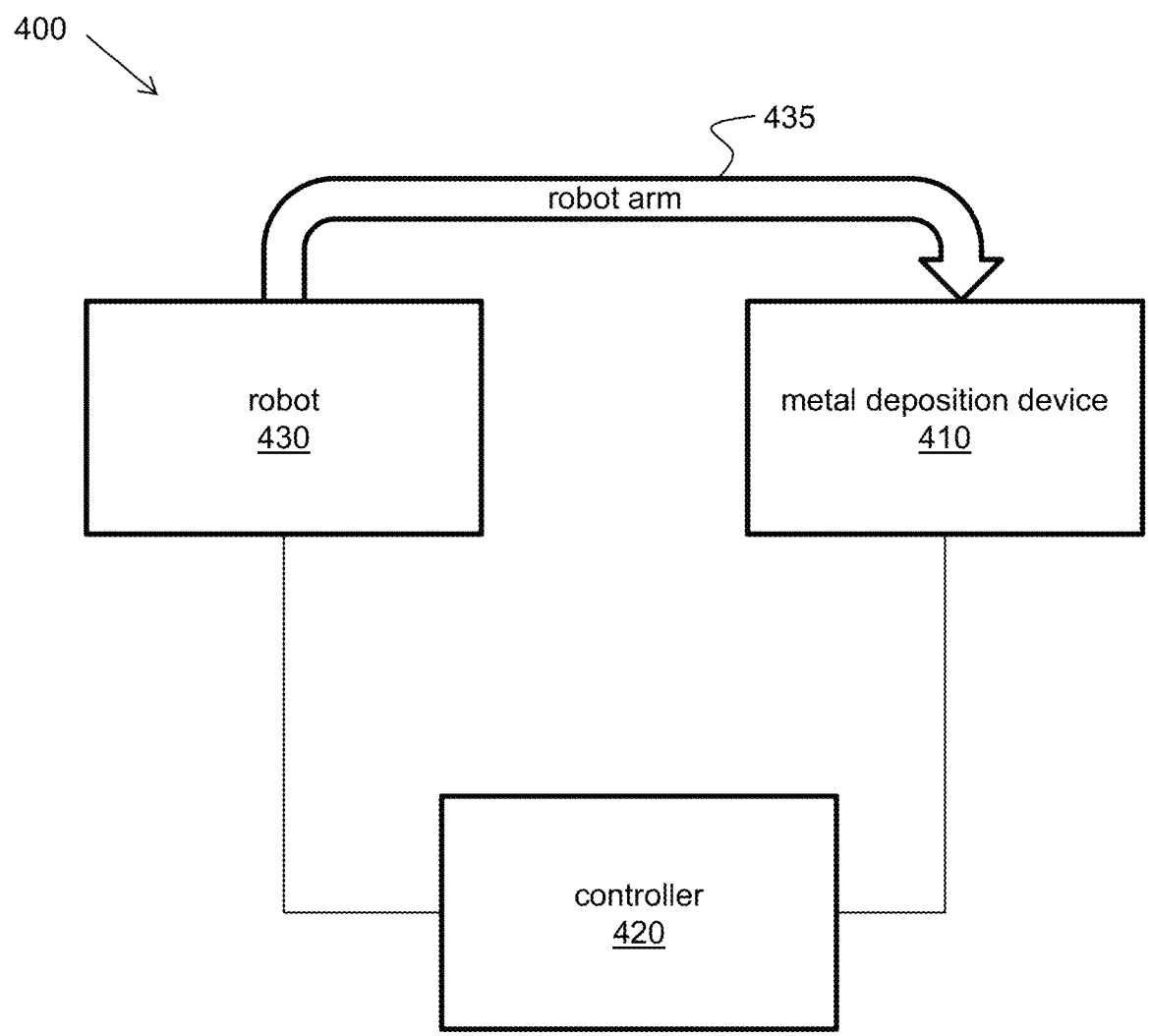
FIG. 4 illustrates a system block diagram of one embodiment of an additive manufacturing system having a metal deposition device.

FIG. 4 illustrates a system block diagram of one embodiment of an additive manufacturing system 400 having a metal deposition device 410. The system 400 also includes a controller 420 and a robot 430 having a robot arm 435. The metal deposition device 410 is configured to deposit molten metal material during an additive manufacturing process to form a part. The controller 420 is operatively coupled to the metal deposition device 410 and the robot 430. That is, in the embodiment of FIG. 4, the controller 420 is configured to control various aspects of the metal deposition device 410 (e.g., wire feeding, output power or energy) and to serve as a motion controller for the robot 430. In accordance with other embodiments, the controller 420 may include two or more controllers (e.g., a first controller to control the metal deposition device 410 and a second controller to control the robot 430). In one embodiment, the robot arm 435 is coupled to the metal deposition device 410 (or to at least a portion of the metal deposition device 410 such as a deposition head) such that the robot 430 can move the metal deposition device 410 in space, via the arm 435, relative to a base or substrate under control of the controller 420. In another embodiment, the robot arm 435 is coupled to the base or substrate such that the robot 430 can move the base or substrate in space, via the arm 435, relative to the metal deposition device 410. The metal deposition device 410 and the robot 430 may be of the types shown in FIGS. 1-2 or FIG. 3, for example, in accordance with certain embodiments. Other types of robots and metal deposition devices are possible as well, in accordance with other various embodiments.

In accordance with one embodiment, the controller 420 commands the metal deposition device 410 to deposit a molten metal material on a base (substrate) during a contour deposition phase of an additive manufacturing process to form a contour of a part. The controller then commands the metal deposition device 410 to deposit the metal material on the base during an infill pattern deposition phase of the additive manufacturing process to form an infill pattern within a region outlined by the contour of the part. The deposition rate of the contour deposition phase is less than a deposition rate of the infill pattern deposition phase, in accordance with one embodiment, allowing the contour to be deposited more accurately and more precisely than the infill pattern. As the additive manufacturing process continues to build successive layers of the part, the metal material is deposited on a previous layer of the contour and infill pattern, for example.

Figure 5:
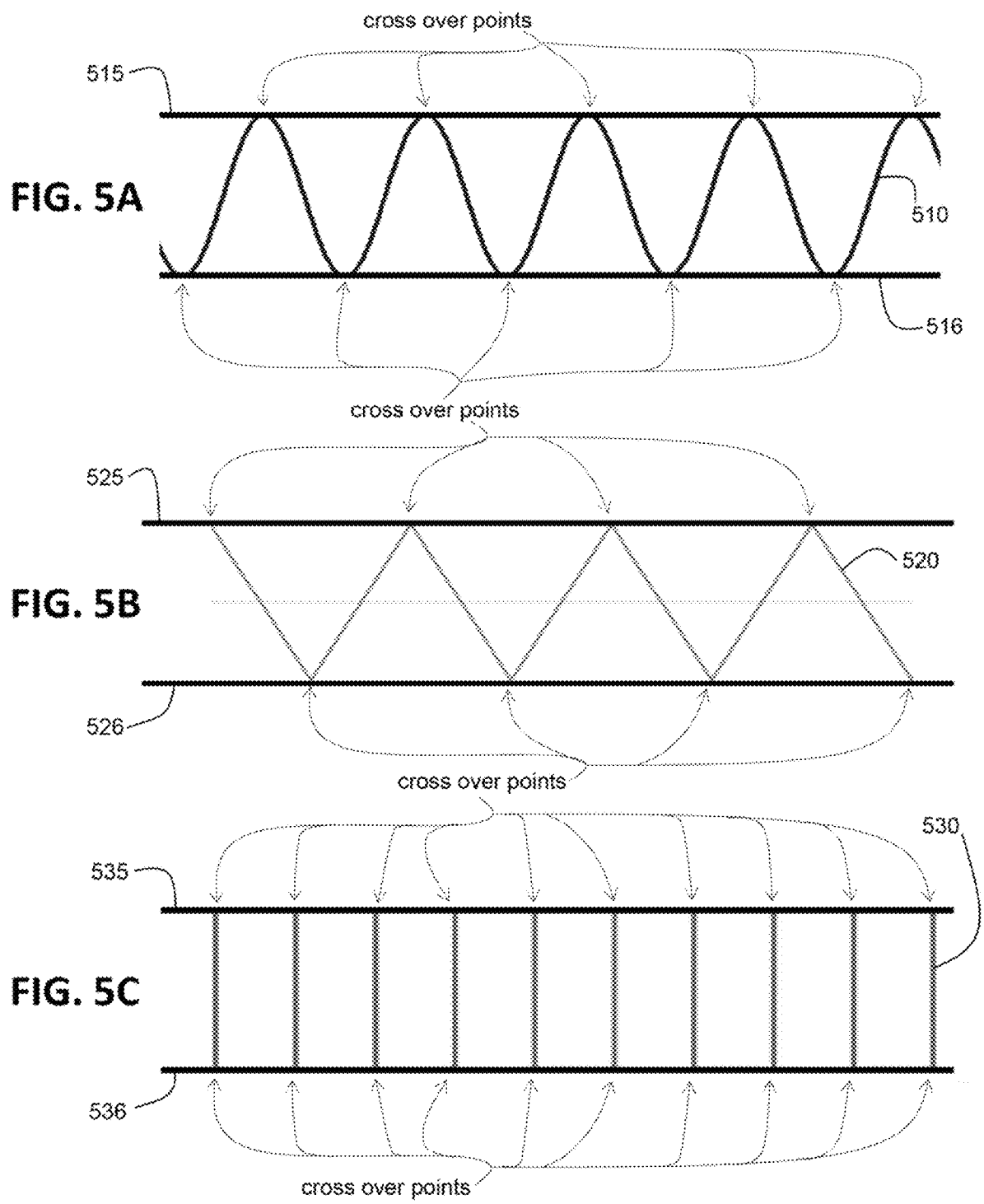
FIGS. 5A, 5B, and 5C graphically illustrate embodiments of wave shapes of infill patterns of a part meeting contours of the part at crossover points.

In accordance with one embodiment, the infill pattern is a wave shape having a wavelength. FIGS. 5A-5C graphically illustrate embodiments of wave shapes of infill patterns of a part that meet contours of the part at crossover points. The crossover points may correspond to load points that are optimized for handling a defined load, for example. FIG. 5A shows a sinusoidal infill pattern 510 deposited between two contour walls 515 and 516, FIG. 5B shows a triangular infill pattern 520 deposited between two contour walls 525 and 526, and FIG. 5C shows a rectangular infill pattern 530 (e.g., a square infill pattern) deposited between two contour walls 535 and 536. The controller 420 is configured to adjust the wavelength of the wave shape to adjust an infill percentage of the part, in accordance with one embodiment. Therefore, as the wavelength of the infill pattern is decreased, the percentage of the part that gets infilled increases. Such wave shape infill patterns allow for the manufacturing of parts (e.g., hand tools) that are strong and lightweight.

During the infill pattern deposition phase, the controller 420 commands the metal deposition device 410 to fuse the metal material of the infill pattern to the metal material of the contour at crossover points. The crossover points are the locations where the infill pattern meets the contour as shown in FIGS. 5A-5C. The contour may form the exterior shape of the part, for example, and it may be desired that the dimensions of the contour be precise when deposited and that the precision be maintained throughout the additive manufacturing process. Therefore, to fuse the infill pattern to the contour, the metal deposition device 410 applies energy at the crossover points without depositing excessive amounts of the metal material at the crossover points that would result in distorting the contour. For example, minimal amounts of metal material may be deposited at the crossover points. In some instances, no additional metal material may be deposited at the crossover points. Instead, only energy is applied that is sufficient to fuse the infill pattern to the contour. In this manner, the contour is not distorted and an undesired "bump" of metal material is not deposited at the crossover points.

Figure 6:
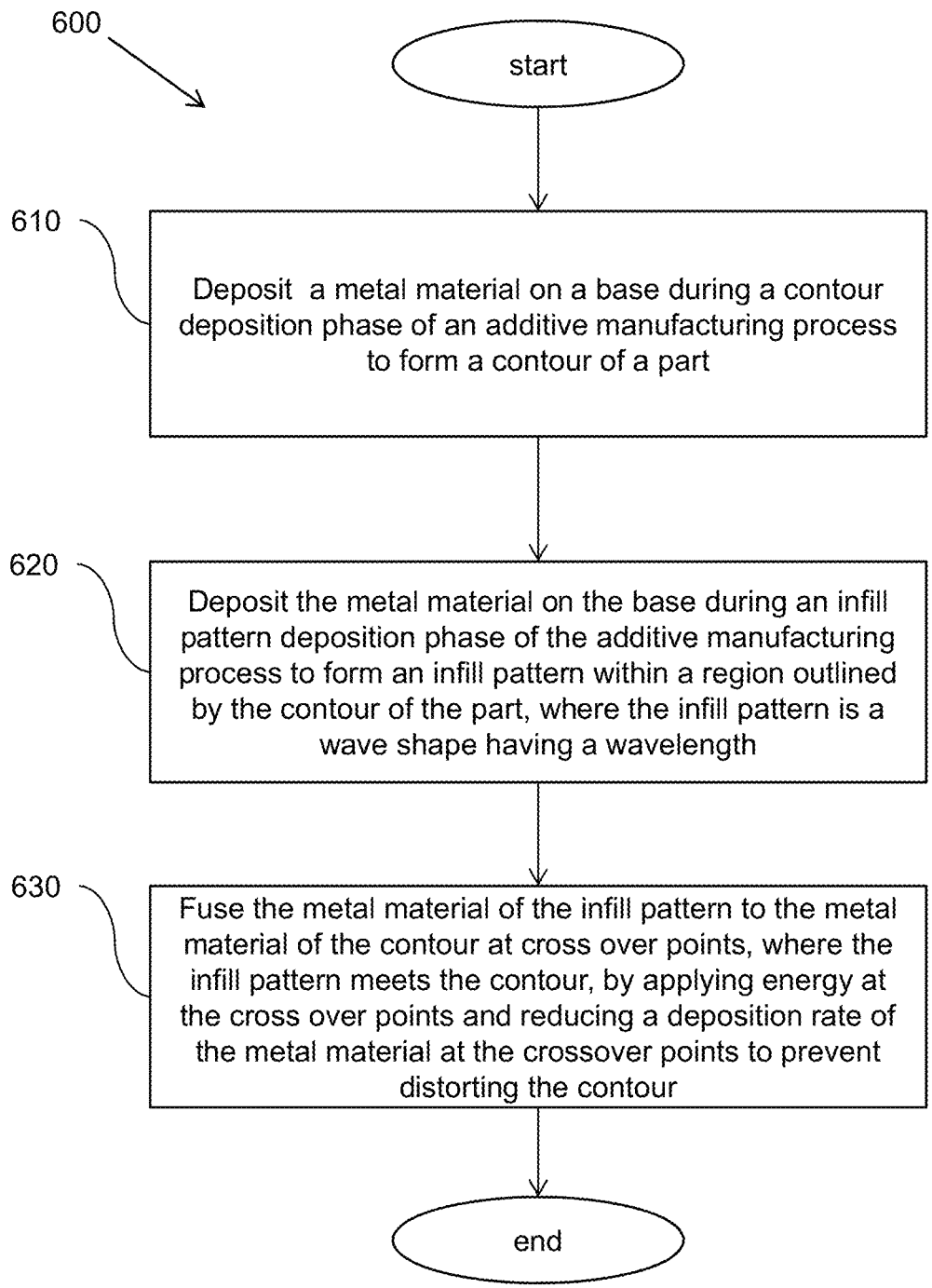
FIG. 6 illustrates a flow chart of one embodiment of a method to additively manufacture a part.

FIG. 6 illustrates a flow chart of one embodiment of a method 600 to additively manufacture a part using, for example, the system 400 of FIG. 4. At block 610, a metal material is deposited on a base during a contour deposition phase of an additive manufacturing process to form a contour of a part. At block 620, the metal material is deposited on the base during an infill pattern deposition phase of the additive manufacturing process to form an infill pattern within a region bound or outlined by the contour of the part. The infill pattern is a wave shape having a wavelength. At block 630, the metal material of the infill pattern is fused to the metal material of the contour at crossover points, where the infill pattern meets the contour, by applying energy at the crossover points and reducing a deposition rate of the metal material at the crossover points to prevent distorting the contour (i.e., without depositing amounts of the metal material at the crossover points that would result in distortion of the contour). In accordance with one embodiment, block 630 is performed as part of the infill deposition phase of block 620 as the infill pattern is being deposited. For example, the system 400 may be configured to dynamically adjust (under control of the controller 420) the amount of metal material deposited and/or the amount of energy applied to melt the metal material as the crossover points are approached and crossed by the metal deposition device 410 during the infill pattern deposition phase (e.g., resulting in reduced deposition rates). In accordance with various embodiments of the present invention, the fusing of a contour to an infill pattern at crossover points can be readily handled, especially in processes (e.g., laser, plasma, TIG) that use metal wire that is independent of the heat (energy) source. Again, as the additive manufacturing process continues to build successive layers of the part, the metal material is deposited on a previous layer of the contour and infill pattern, for example, in a similar manner.

Figure 7:
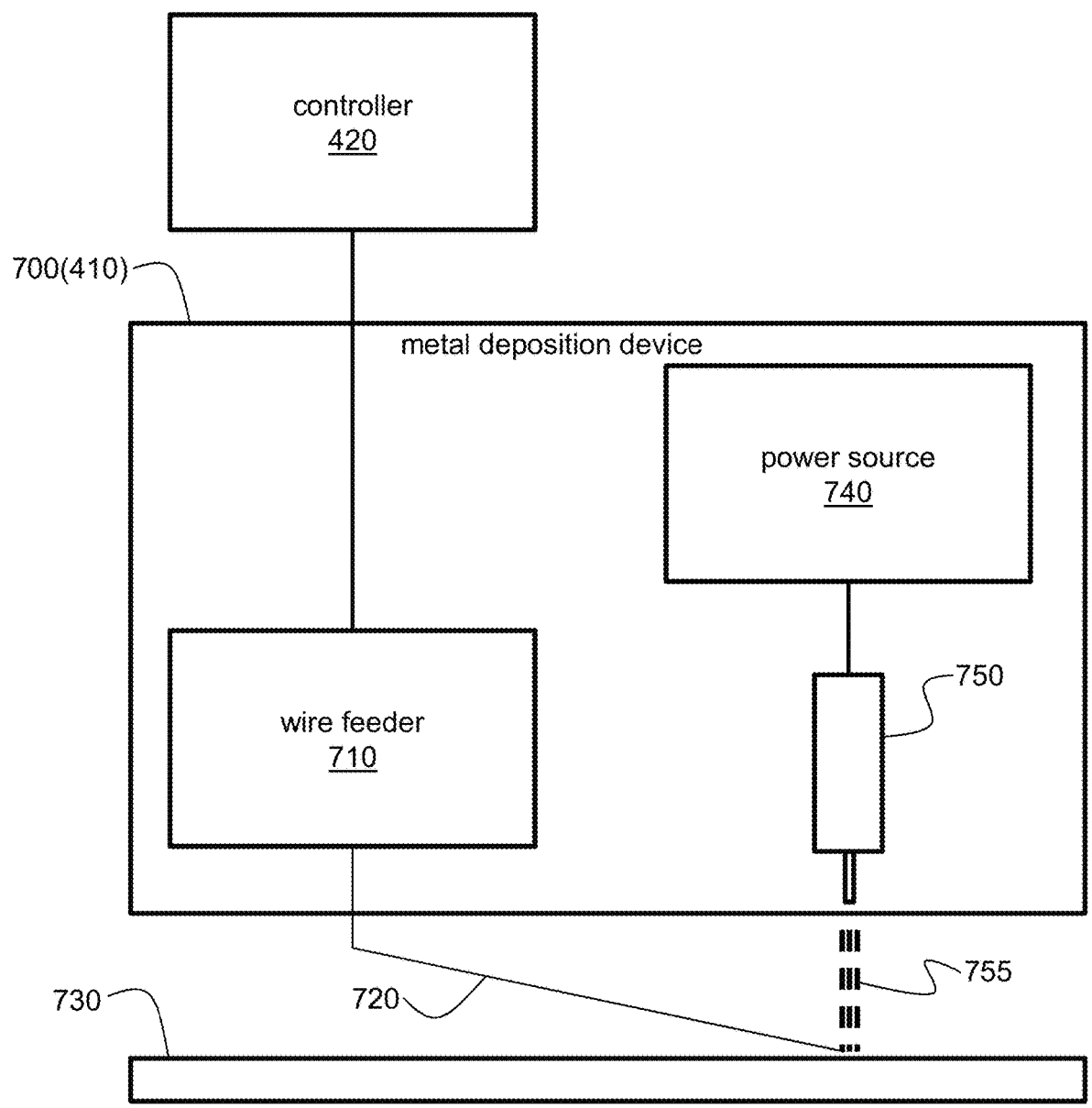
FIG. 7 illustrates a system block diagram of one embodiment of the metal deposition device of FIG. 4 that is laser based and which includes a wire feeder that is controlled by the controller of FIG. 4.

FIG. 7 illustrates a system block diagram of one embodiment 700 of the metal deposition device 410 of FIG. 4 that is laser based and which includes a wire feeder 710 that is controlled by the controller 420 of FIG. 4. The metal deposition device 700 may have elements and/or combinations of elements that are similar that of FIGS. 1-3, for example, in accordance with certain embodiments. The wire feeder 710 is configured to feed a filler wire 720 of a metal material toward a base 730. The embodiment of the metal deposition device 700 of FIG. 7 also includes a power source 740 and a laser device 750 operatively connected to the power source 740. The power source 740 and the laser device 750 are configured to provide energy (in the form of a laser beam 755) to melt the filler wire 720 (and possibly part of the base 730) during an additive manufacturing process. The controller 420 is operatively connected to the wire feeder 710 and is configured to reduce a rate of feeding of the filler wire 720 at the crossover points, or totally stop feeding of the filler wire 720 at the crossover points, during an infill pattern deposition phase of the additive manufacturing process. Furthermore, in one embodiment, the power source 740 is controlled to adjust an amount of energy output by the laser device 750 at the crossover points. For example, the amount of energy output by the laser device 750 may be reduced at the crossover points such that the contour is fused to the infill pattern but no significant amount of new metal material is deposited at the crossover points, and such that the contour is not distorted or damaged at the crossover points. Again, as the additive manufacturing process continues to build successive layers of the part, the metal material is deposited on a previous layer of the contour and infill pattern, for example, in a similar manner.

Figure 8:
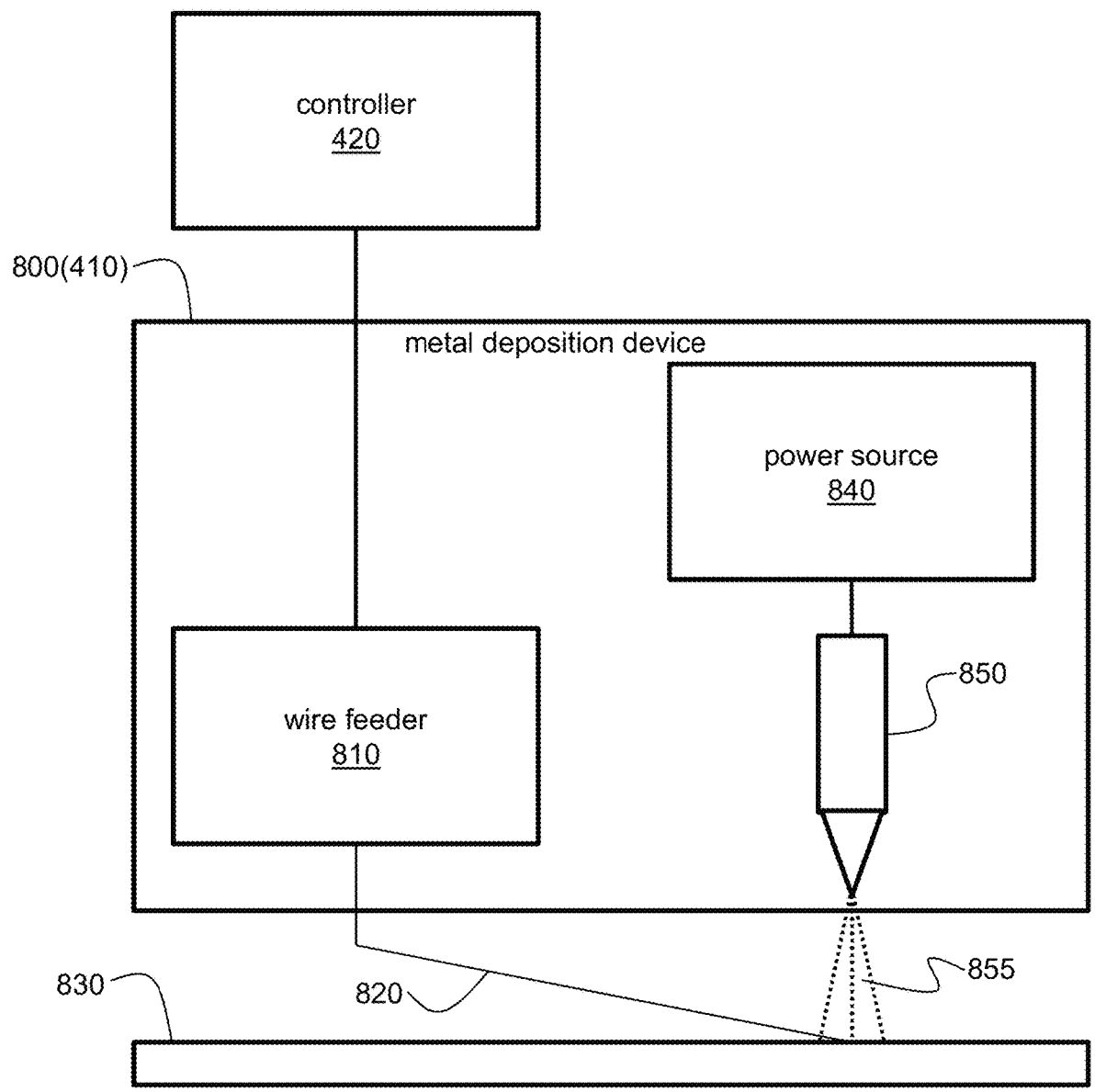
FIG. 8 illustrates a system block diagram of one embodiment of the metal deposition device of FIG. 4 that is non-consumable electrode based and which includes a wire feeder that is controlled by the controller of FIG. 4.

FIG. 8 illustrates a system block diagram of one embodiment 800 of the metal deposition device 410 of FIG. 4 that is non-consumable electrode based and which includes a wire feeder 810 that is controlled by the controller 420 of FIG. 4. The metal deposition device 800 may have elements and/or combinations of elements that are similar that of FIGS. 1-3, for example, in accordance with certain embodiments. The wire feeder 810 is configured to feed a filler wire 820 of a metal material toward a base 830. The embodiment of the metal deposition device 800 of FIG. 8 also includes a power source 840 and a non-consumable electrode 850 (e.g., a tungsten electrode) operatively connected to the power source 840. The power source 840 and the non-consumable electrode 850 are configured to provide energy (in the form of a plasma beam or arc 855) to melt the filler wire 820 (and possibly part of the base 830) during an additive manufacturing process. The controller 420 is operatively connected to the wire feeder 810 and is configured to reduce a rate of feeding of the filler wire 820 at the crossover points, or totally stop feeding of the filler wire 820 at the crossover points, during an infill pattern deposition phase of the additive manufacturing process. Furthermore, in one embodiment, the power source 840 is controlled to adjust an amount of energy provided via the electrode 850 at the crossover points. For example, the amount of energy provided by the electrode 850 may be reduced at the crossover points such that the contour is fused to the infill pattern but no significant amount of new metal material is deposited at the crossover points, and such that the contour is not distorted or damaged at the crossover points. Again, as the additive manufacturing process continues to build successive layers of the part, the metal material is deposited on a previous layer of the contour and infill pattern, for example, in a similar manner.

Figure 9:
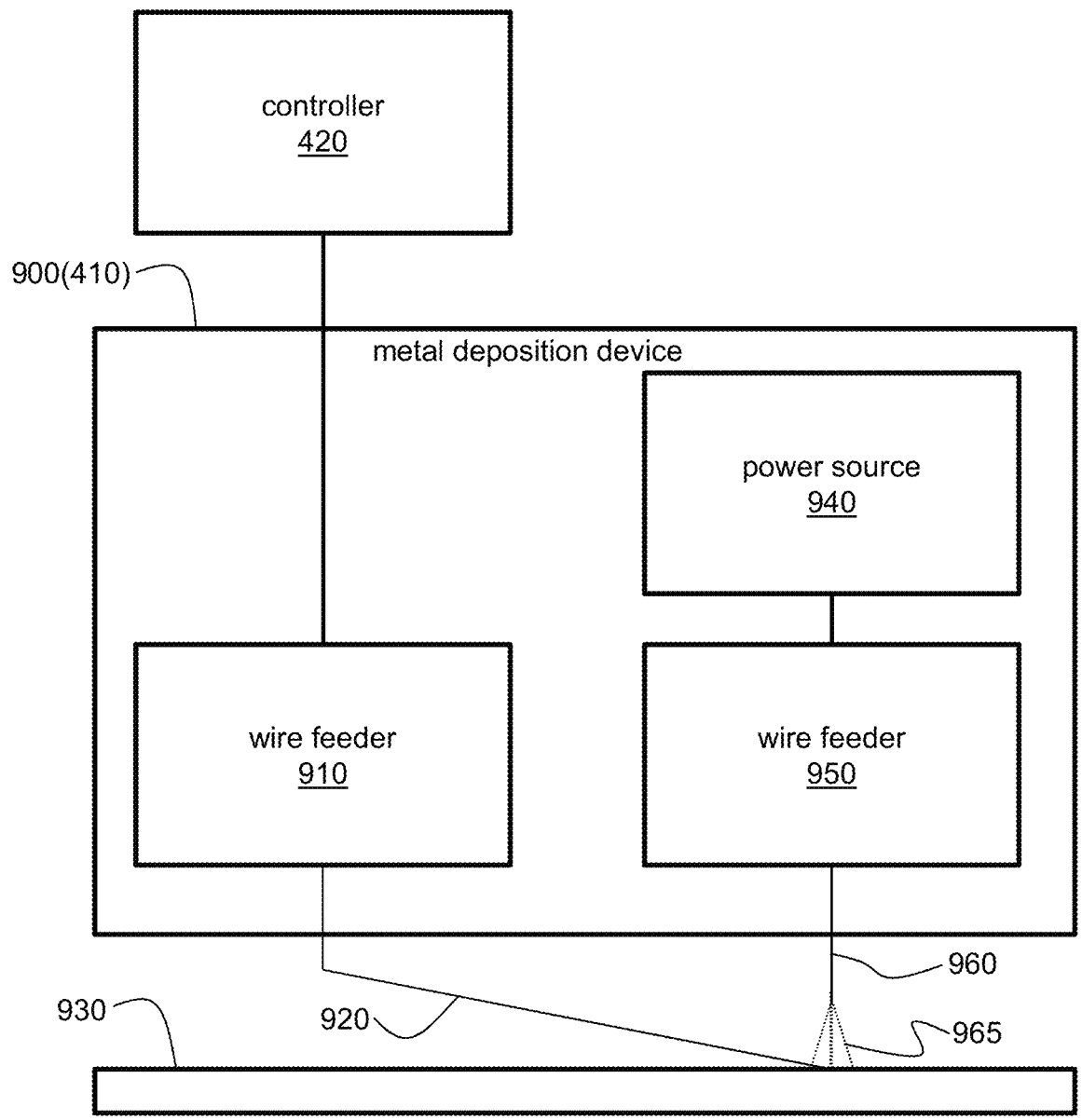
FIG. 9 illustrates a system block diagram of one embodiment of the metal deposition device of FIG. 4 that is consumable electrode based and which includes a wire feeder that is controlled by the controller of FIG. 4.

FIG. 9 illustrates a system block diagram of one embodiment 900 of the metal deposition device 410 of FIG. 4 that is consumable electrode based and which includes a first wire feeder 910 that is controlled by the controller 420 of FIG. 4. The metal deposition device 900 may have elements and/or combinations of elements that are similar that of FIGS. 1-3, for example, in accordance with certain embodiments. The wire feeder 910 is configured to feed a filler wire 920 of a metal material toward a base 930. The embodiment of the metal deposition device 900 of FIG. 9 also includes a power source 940 and a second wire feeder 950 operatively connected to the power source 940. The second wire feeder 950 is configured to feed a consumable wire electrode 960 toward the base 930. The power source 940 and the second wire feeder 950 are configured to provide energy via the consumable wire electrode 960 (forming an electric arc 965 between the electrode 960 and the base 930) to melt the filler wire 920 and the consumable wire electrode 960 (and possibly part of the base 930) during an additive manufacturing process. The controller 420 is operatively connected to the first wire feeder 910 and is configured to reduce a rate of feeding of the filler wire 920 at the crossover points, or totally stop feeding of the filler wire 920 at the crossover points, during an infill pattern deposition phase of the additive manufacturing process. Furthermore, in one embodiment, the power source 940 is controlled (e.g., via the controller 420) to adjust an amount of energy provided to the electrode 960 at the crossover points. For example, the amount of energy provided to the electrode 960 may be reduced at the crossover points such that the contour is fused to the infill pattern and a limited amount of new metal material is deposited at the crossover points, and such that the contour is not distorted or damaged at the crossover points. Again, as the additive manufacturing process continues to build successive layers of the part, the metal material is deposited on a previous layer of the contour and infill pattern, for example, in a similar manner.

Figure 10:
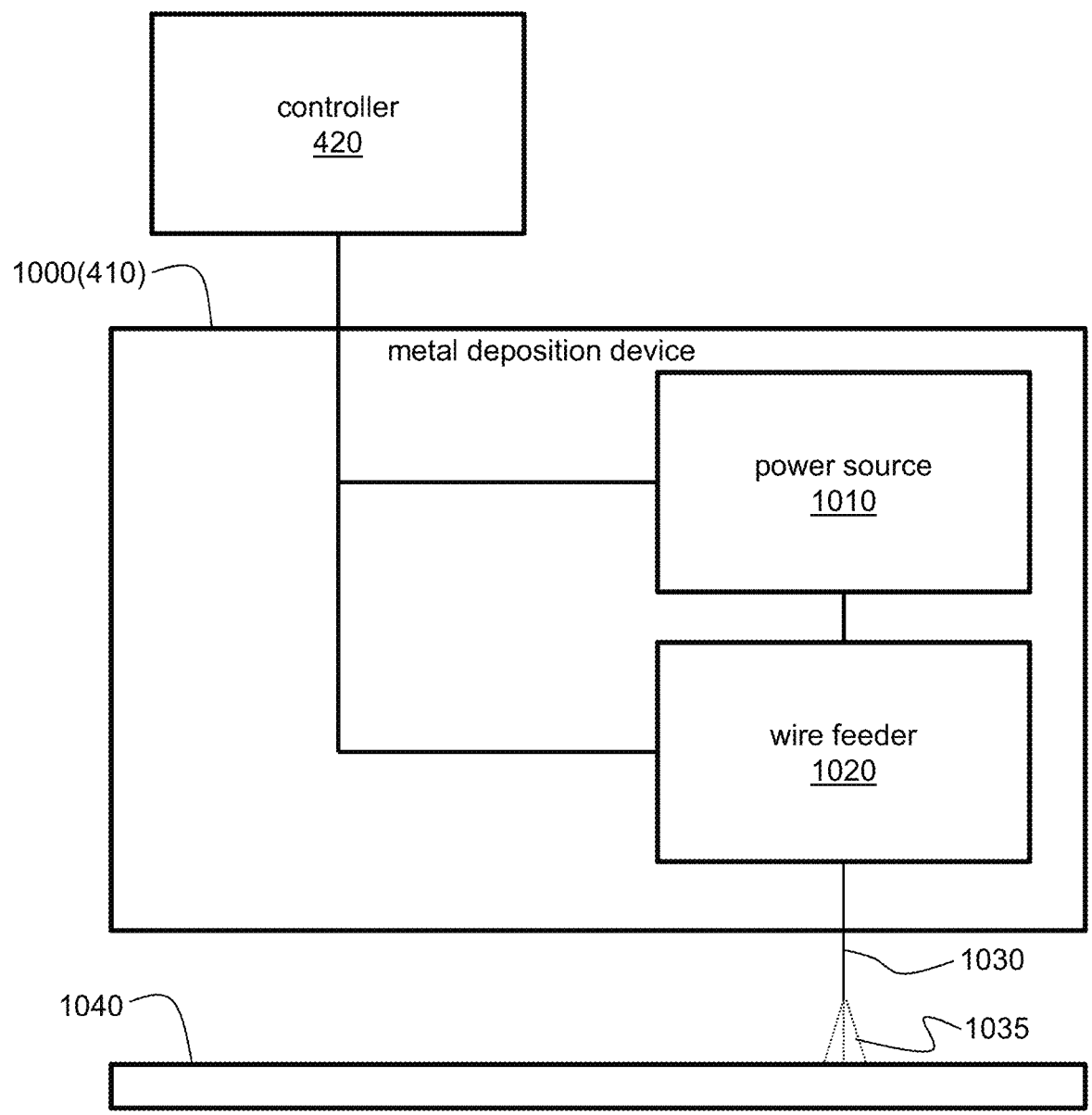
FIG. 10 illustrates a system block diagram of one embodiment of the metal deposition device of FIG. 4 that is consumable electrode based and which includes a power source and a wire feeder that are controlled by the controller of FIG. 4.

FIG. 10 illustrates a system block diagram of one embodiment 1000 of the metal deposition device 410 of FIG. 4 that is consumable electrode based and which includes a power source 1010 and a wire feeder 1020 that are controlled by the controller 420 of FIG. 4. The metal deposition device 1000 may have elements and/or combinations of elements that are similar that of FIGS. 1-3, for example, in accordance with certain embodiments. The wire feeder 1020 is configured to feed a consumable wire electrode 1030 of a metal material toward a base 1040. The power source 1010 is operatively connected to the wire feeder 1020. The power source 1010 and the wire feeder 1020 are configured to provide energy via the consumable wire electrode 1030 (forming an electric arc 1035 between the electrode 1030 and the base 1040) to melt the consumable wire electrode 1030 (and possibly part of the base 1040) during an additive manufacturing process. The controller 420 is configured to reduce a rate of feeding of the consumable wire electrode 1030 at the crossover points and/or reduce the energy provided by the power source to the consumable wire electrode at the crossover points during an infill pattern deposition phase of the additive manufacturing process. In this manner, the contour is fused to the infill pattern and a limited amount of new metal material is deposited at the crossover points such that the contour is not distorted or damaged at the crossover points. Again, as the additive manufacturing process continues to build successive layers of the part, the metal material is deposited on a previous layer of the contour and infill pattern, for example, in a similar manner.

Figure 11:
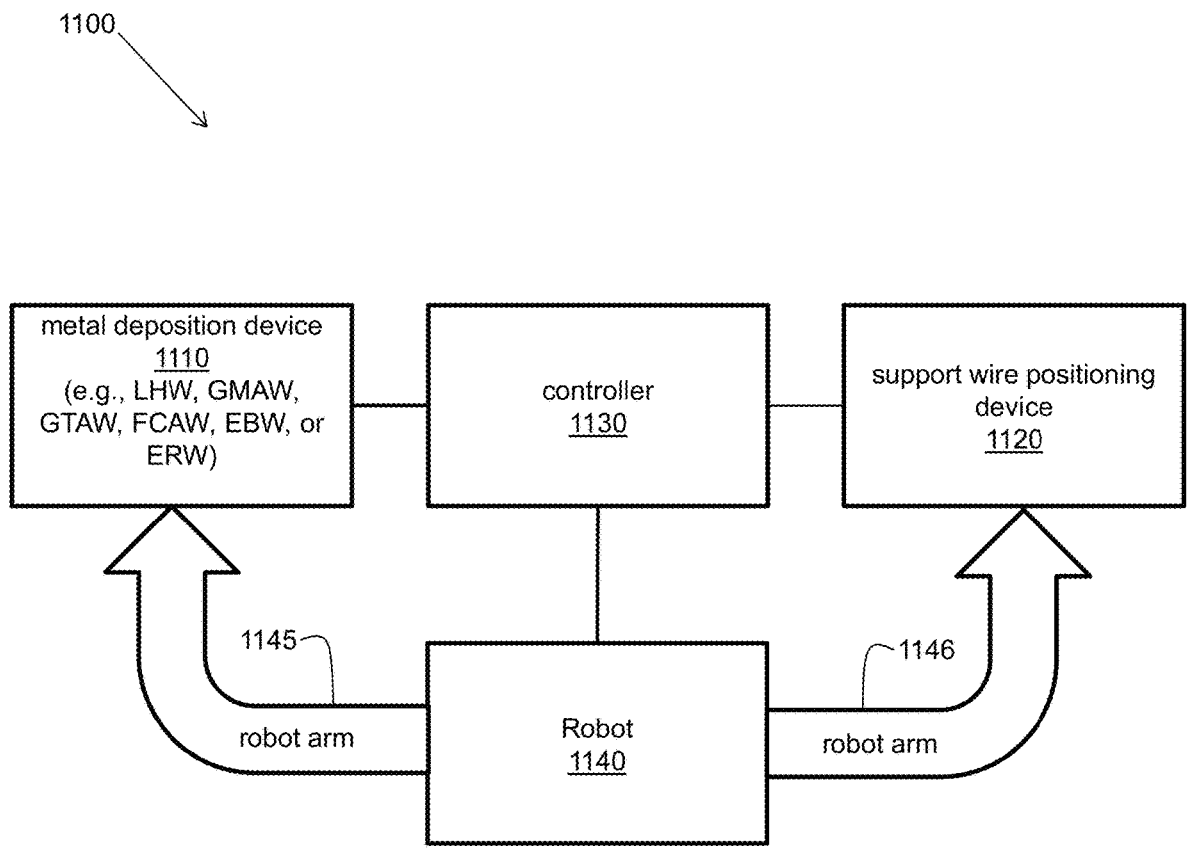
FIG. 11 illustrates a system block diagram of one embodiment of an additive manufacturing system having a metal deposition device and a support wire positioning device.

FIG. 11 illustrates a system block diagram of one embodiment of an additive manufacturing system 1100 having a metal deposition device 1110 and a support wire positioning device 1120. The system 1100 also includes a controller 1130 and a robot 1140 having robot arms 1145 and 1146. The metal deposition device 1110 is configured to deposit molten metal material during an additive manufacturing process to form a part. The support wire positioning device 1120 is configured to position at least one metal support wire during the additive manufacturing process to support a portion(s) of the part. The controller 1130 is operatively coupled to the metal deposition device 1110, the support wire positioning device 1120, and the robot 1140. That is, in the embodiment of FIG. 11, the controller 1140 is configured to control various aspects of the metal deposition device 1110 (e.g., wire feeding, output power or energy), the wire positioning device 1120, and to serve as a motion controller for the robot 1140. In accordance with other embodiments, the controller 1130 may include two or more controllers (e.g., a first controller to control the metal deposition device 1110, a second controller to control the support wire positioning device 1120, and a third controller to control the robot 1140).

In one embodiment, the robot arm 1145 is coupled to the metal deposition device 1110 (or to at least a portion of the metal deposition device 1110 such as a deposition head) such that the robot 1140 can move the metal deposition device 1110 in space, via the arm 1145, relative to a base or substrate under control of the controller 1130. In one embodiment, the robot arm 1146 is coupled to the support wire positioning device 1120 (or to at least a portion of the support wire positioning device 1120) such that the robot 1140 can move the support wire positioning device 1120 in space, via the arm 1146, relative to a base or substrate under control of the controller 1130. In another embodiment, the robot arm 1145 is coupled to the base or substrate such that the robot 1140 can move the base or substrate in space, via the arm 1145, relative to the metal deposition device 1110 and/or the support wire positioning device 1120. The metal deposition device 1110 and the robot 1140 may be of the types shown in FIGS. 1-2 or FIG. 3, for example, in accordance with certain embodiments. Other types of robots and metal deposition devices are possible as well, in accordance with other various embodiments.

Figure 12:
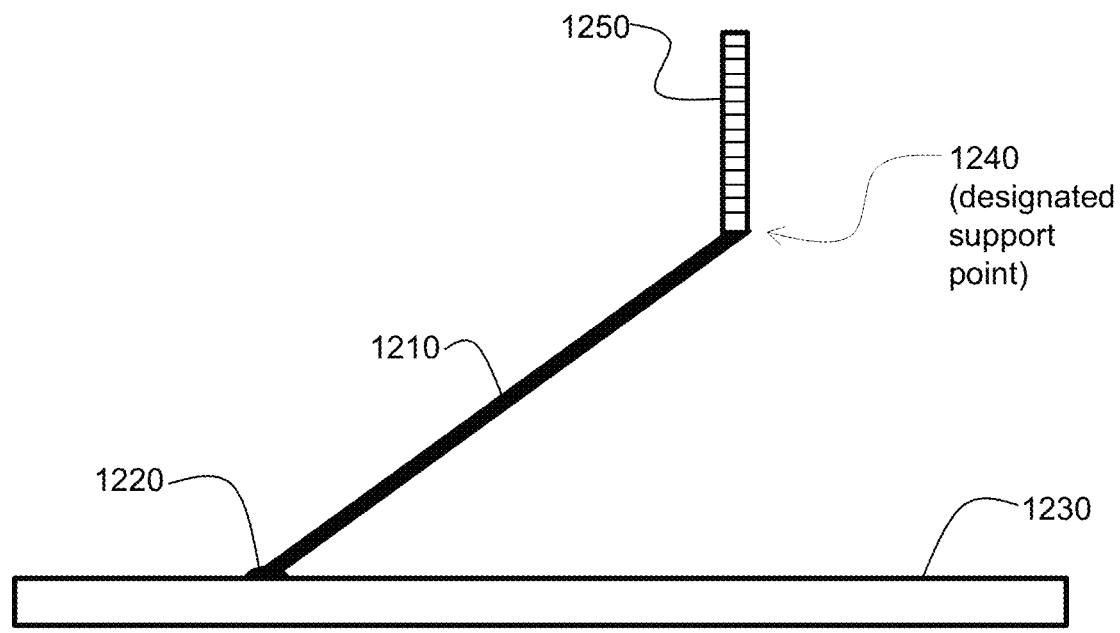
FIG. 12 graphically illustrates one embodiment of a support wire positioned by the support wire positioning device of the additive manufacturing system of FIG. 11 between a base and a designated point in space.

FIG. 12 graphically illustrates one embodiment of a metal support wire or rod 1210 positioned by the support wire positioning device 1120 of the additive manufacturing system 1100 of FIG. 11 between a first location 1220 on a base 1230 and a designated support point (location) 1240 in space. The metal support wire 1210 may be, for example, a subarc wire. Layers of metal material may then be deposited on a second end of the metal support wire 1210 at the designated support location 1240 by the metal deposition device 1110 during the additive manufacturing process to form a portion of a part 1250 supported by the metal support wire 1210. The controller 1130 controls the additive manufacturing process. For example, the controller 1130 is configured to command the support wire positioning device 1120 to weld (e.g., tack weld or spot weld) a first end of the metal support wire 1210 to the first location 1220 on the base 1230 upon which the part is to be additively manufactured. The controller 1130 is also configured to command the support wire positioning device 1120 to position the second end of the metal support wire 1210 at the designated support location 1240 in free space (details of which are discussed later herein). Instead of a point in free space, the controller 1130 may command the support wire positioning device 1120 to position the second end of the metal support wire 1210 at a point or location corresponding to another part of the part being built or to another support structure. The controller 1130 is further configured to command the metal deposition device 1110 to deposit molten metal material on the second end of the metal support wire 1210 during the additive manufacturing process to form a portion of the part 1250 supported by the metal support wire 1210. The controller 1130 commands the robot 1140 (having robot arms 1145 and 1146) to aid in positioning and securing the metal support wire 1210 (via the support wire positioning device 1120) and in depositing metal material to form the portion of the part 1250 (via the metal deposition device 1110).

Figure 13:
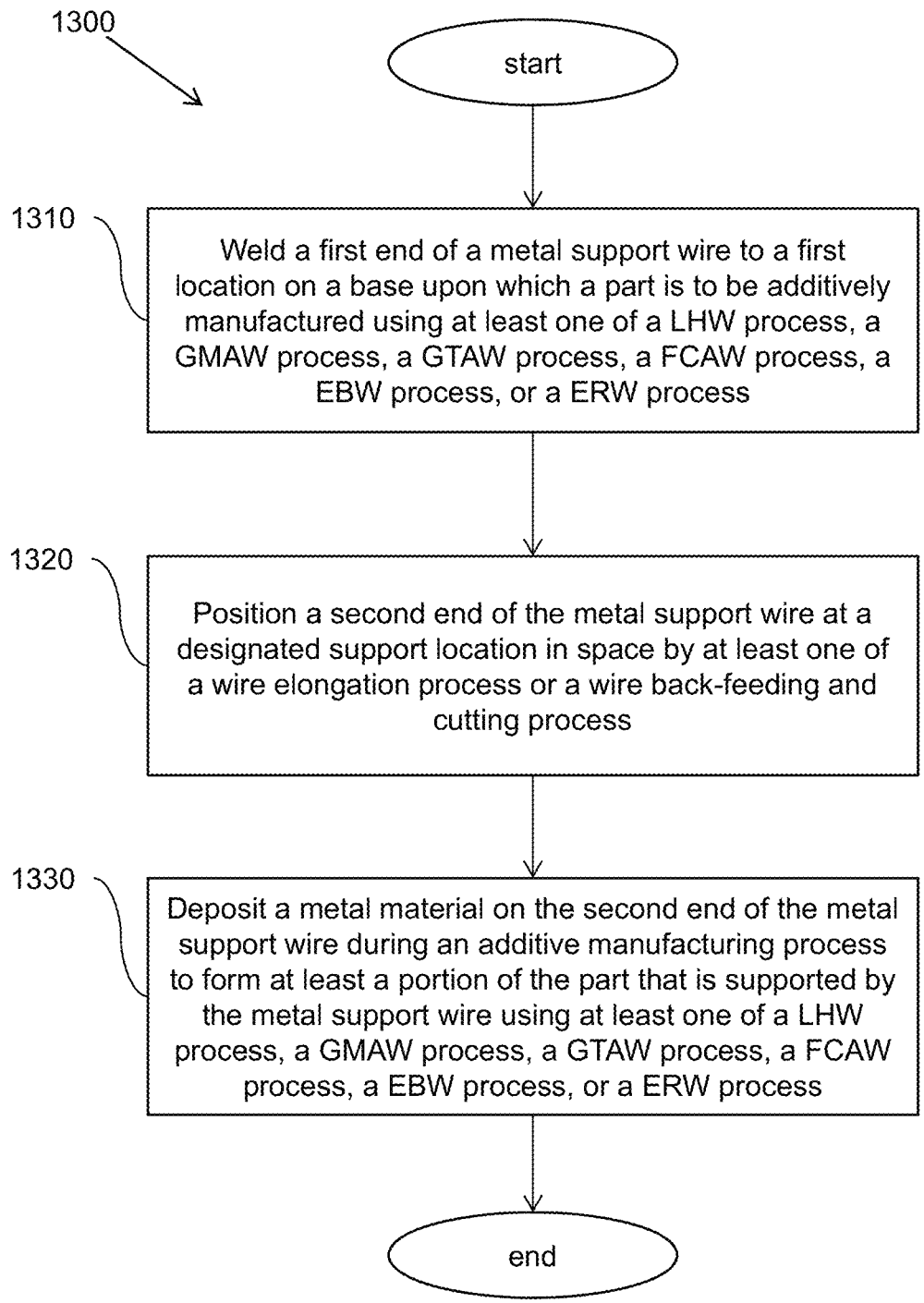
FIG. 13 illustrates a flow chart of one embodiment of a method to additively manufacture a portion of a part by using a support wire.

FIG. 13 illustrates a flow chart of one embodiment of a method 1300 to additively manufacture a portion of a part by using a metal support wire. At block 1310, a first end of a metal support wire is welded to a first location on a base upon which a part is to be additively manufactured. A support wire positioning device uses at least one of a laser hot-wire (LHW) process, a gas metal arc welding (GMAW) process, a gas tungsten arc welding (GTAW) process, a flux-cored arc welding (FCAW) process, an electron beam welding (EBW) process, or an electric resistance welding (ERW) process (e.g., Joule heating) to weld the first end of the metal support wire to the first location on the base. At block 1320, a second end of the metal support wire is positioned at a designated support point (location) in space by at least one of a wire elongation process or a wire back-feeding and cutting process (described in detail later herein). At block 1330, a metal material is deposited on a second end of the metal support wire during an additive manufacturing process to form at least a portion of a part that is supported by the metal support wire. A metal deposition device uses at least one of a laser hot-wire (LHW) process, a gas metal arc welding (GMAW) process, a gas tungsten arc welding (GTAW) process, a flux-cored arc welding (FCAW) process, an electron beam welding (EBW) process, or an electric resistance welding (ERW) process to deposit the metal material.

Figure 14:
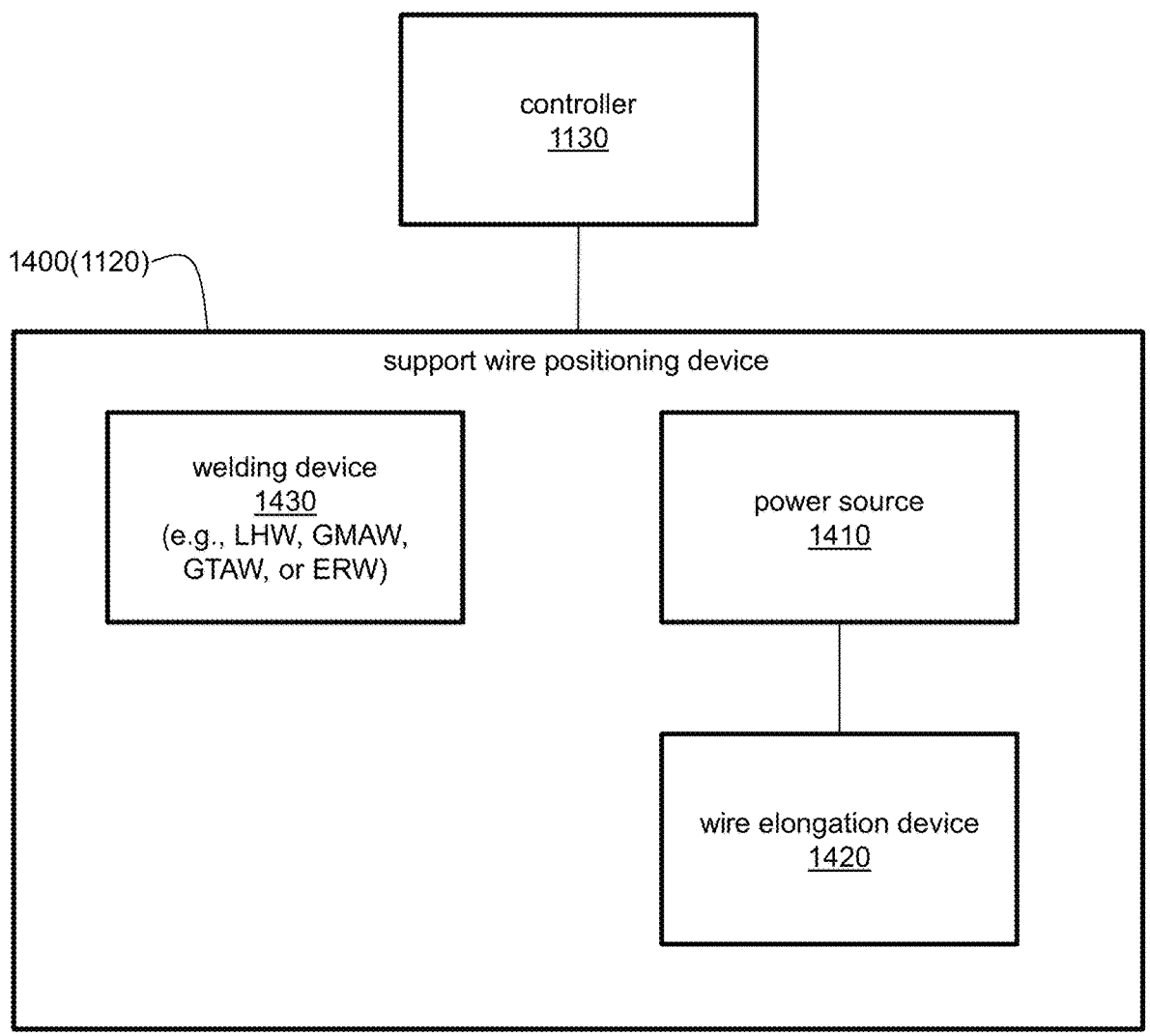
FIG. 14 illustrates a system block diagram of one embodiment of the support wire positioning device of FIG. 11, controlled by the controller of FIG. 11, having a power source and a wire elongation device.

FIG. 14 illustrates a system block diagram of one embodiment 1400 of the support wire positioning device 1120 of FIG. 11, controlled by the controller 1130 of FIG. 11, and having a power source 1410, a wire elongation device 1420, and a welding device 1430. The welding device 1430 is configured to use at least one of a laser hot-wire (LHW) process, a gas metal arc welding (GMAW) process, a gas tungsten arc welding (GTAW) process, a flux-cored arc welding (FCAW) process, an electron beam welding (EBW) process, or an electric resistance welding (ERW) to weld a first end of a metal support wire to a first location on a base. As such, in one embodiment, the welding device 1430 is configured to be moved (e.g., via the robot 1140 as part of moving the support wire positioning device 1400) toward the first location on the base while holding the metal support wire, to position the first end of the metal support wire on the base and weld the first end of the metal support wire to the base. The orientation of the metal support wire coming off the base may be situated as well by the welding device 1430 such that a current position in space of a second end of the metal support wire, having a known length, can be determined. In one embodiment, the metal support wire is of the proper length such that the second end of the metal support wire can be oriented at the designated support point in space. In another embodiment, the metal support wire is a short, stubby wire that effectively needs to be "stretched" (e.g., extruded or drawn) to the designated support point.

In one embodiment, the power source 1410 is operatively connected to the wire elongation device 1420 and is configured to heat the metal support wire (e.g., via Joule heating) to an extruding temperature or a drawing temperature by passing an electric current through the metal support wire (e.g., and through the base which is electrically conductive). The wire elongation device 1420 is configured to extrude or draw the metal support wire, once heated, in a direction toward the designated support point (location), while the first end of the metal support wire remains attached to the first location on the base. In this manner, the metal support wire is effectively "stretched" until the second end reaches the designated support point. As such, in one embodiment, the wire elongation device 1420 is configured to grab the second end of the metal support wire, at the determined current position in space. The power source 1410 provides the electric current (e.g., through the wire elongation device) to heat the metal support wire. The wire elongation device is then moved (e.g., via the robot 1140 as part of moving the support wire positioning device 1400) towards the designated support point. This is all done under the control of the controller 1130. Again, in alternative embodiments, the base can be moved by the robot 1140 under the control of the controller 1130 instead of moving the metal deposition device or the support wire positioning device (or portions thereof) to achieve the same results of positioning the metal support wire and depositing a metal material on the metal support wire. In accordance with one embodiment, the support wire positioning device includes a vision system (e.g., including a camera) that is configured to sense the location of the second end of the metal support wire such that the wire elongation device can be controlled and directed to grab the second end of the metal support wire.

Figure 15:
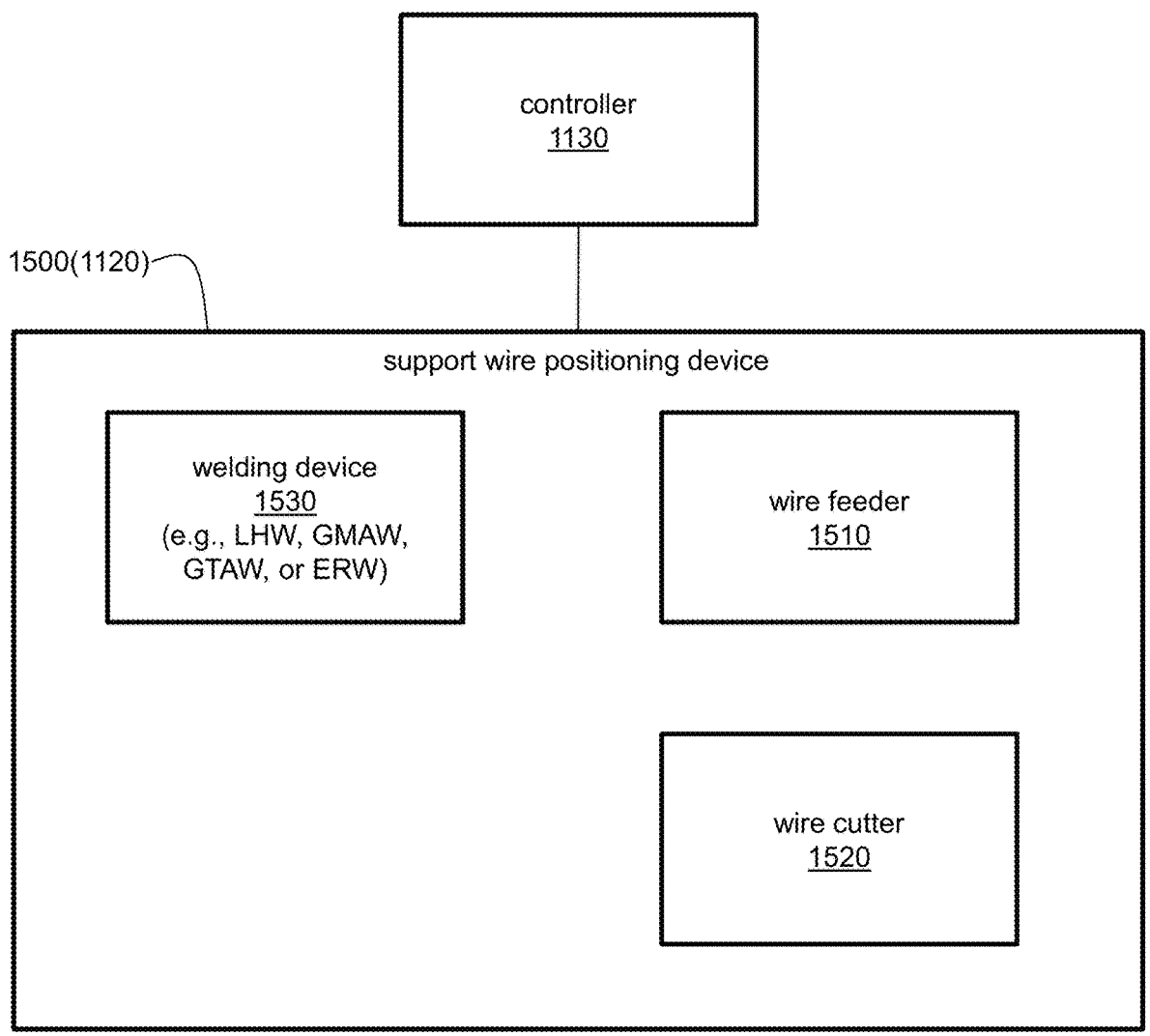
FIG. 15 illustrates a system block diagram of one embodiment of the support wire positioning device of FIG. 11, controlled by the controller of FIG. 11, having a wire feeder and a wire cutter.

FIG. 15 illustrates a system block diagram of one embodiment 1500 of the support wire positioning device 1120 of FIG. 11, controlled by the controller 1130 of FIG. 11, having a wire feeder 1510, a wire cutter 1520, and a welding device 1530. The welding device 1530 is configured to use at least one of a laser hot-wire (LHW) process, a gas metal arc welding (GMAW) process, a gas tungsten arc welding (GTAW) process, a flux-cored arc welding (FCAW) process, an electron beam welding (EBW) process, or an electric resistance welding (ERW) to weld a first end of a metal support wire to a first location on a base. As such, in one embodiment, the welding device 1530 and the wire feeder 1510 are configured to be moved (e.g., via the robot 1140 as part of moving the support wire positioning device 1500) toward the first location on the base to position the first end of the metal support wire on the base and weld the first end of the metal support wire to the base, all under the control of the controller 1130. The metal support wire may be in the form of a coil of wire that is operatively engaged with the wire feeder 1510. In one embodiment, the wire feeder 1510 forward-feeds the metal support wire such that the first end of the metal support wire touches the base at the first location. Then the welding device 1530 welds the first end of the metal support wire to the base at the first location.

The wire feeder 1510 is also configured to back-feed the metal support wire from the first location on the base to at least a designated support point in space. As such, in one embodiment, the wire feeder 1510 is configured to be moved backwards (e.g., via the robot 1140 as part of the support wire positioning device 1500) towards the designated support point while unrolling the coil of the metal support wire, all under the control of the controller 1130. The wire cutter 1520 is configured to cut the metal support wire at the designated support point to form a second end of the metal support wire. For example, in one embodiment, the wire cutter 1520 is directed to the designated support point (e.g., via the robot 1140 as part of moving the support wire positioning device 1500) and commanded to cut the metal support wire, all under the control of the controller 1130. Again, in alternative embodiments, the base can be moved by the robot 1140 under the control of the controller 1130 instead of moving the metal deposition device or the support wire positioning device (or portions thereof) to achieve the same results of positioning the metal support wire and depositing a metal material on the metal support wire. In accordance with one embodiment, the support wire positioning device includes a vision system (e.g., including a camera) that is configured to sense the metal support wire such that the wire cutter can be controlled and directed to cut the metal support wire to form the second end of the metal support wire at the designated support point.

Figure 16:
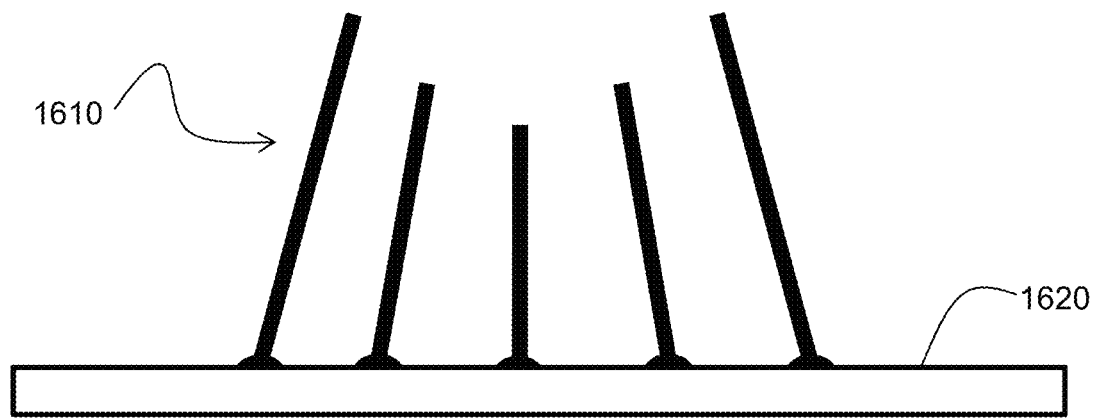
FIG. 16 illustrates one embodiment of an array of multiple metal support wires positioned and welded to a base such that a portion of a part can be additively manufactured above the base.

In accordance with one embodiment, multiple metal support wires or rods (e.g., in the form of an array of metal support wires or rods) may be positioned and welded to a base by a support wire positioning device as described herein. Each metal support wire may be positioned and welded in a particular order (e.g., under the control of the controller) such that previously positioned and welded metal support wires don't interfere with the positioning and welding of subsequent metal support wires. In accordance with another embodiment, metal support wires or rods can be manually positioned and welded to a base by a person as part of setting up a configuration for a part to be additively manufactured. In such an embodiment, a support wire positioning device may not be used. In general, the multiple metal support wires may be of the same or different lengths, in accordance with various embodiments. FIG. 16 illustrates one embodiment of an array of multiple metal support wires 1610 positioned and welded to a base 1620 such that a portion of a part can be additively manufactured above the base 1620. A metal support wire may also be positioned, for example, between two previously positioned metal support wires and welded thereto, either manually or using the system 1100 of FIG. 11. The metal support wires may remain a permanent part of the part being additively manufactured or may be removed from the final part, in accordance with various embodiments. In this manner, building of a part can be relatively fast since wires/rods can be used as the support structures instead of having to additively manufacture the support structures, layer by layer. Furthermore, in some embodiments, the metal wires/rods can be used as a build base instead of using a separate base/substrate.

Figure 17:
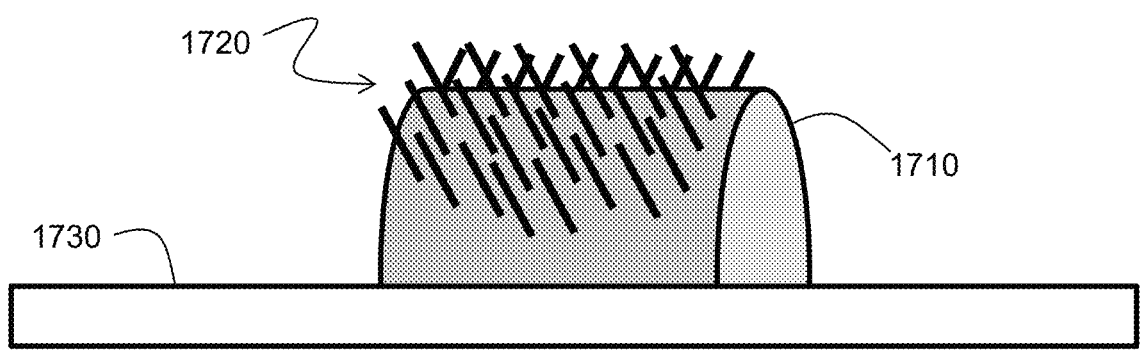
FIG. 17 illustrates one embodiment of a contoured support frame holding multiple metal support wires/rods on a base for additively manufacturing a contoured portion of a part above the base.

FIG. 17 illustrates one embodiment of a contoured support frame 1710 holding multiple metal support wires/rods 1720 on a base 1730 for additively manufacturing a portion of a part (e.g., a contoured portion of a part) above the base 1730. The contoured support frame 1710 is formed/manufactured before performing the additive manufacturing process to generate the part. The contoured support frame 1710 is designed so as to allow the multiple metal support wires/rods 1720 to be placed within holes or vias of the contoured support frame 1710 at the correct height and angles for additively manufacturing a portion of the part on top of the multiple metal support wires/rods 1720. In some embodiments, the contoured support frame 1710 may be electrically conductive (e.g., made of a metal material) and in other embodiments, the contoured support frame 1710 may be electrically non-conductive (e.g., made of a non-conductive ceramic material).

In one embodiment, the lower ends of the multiple metal support wires/rods 1720 make electrical contact with the base 1730 (which is electrically conductive) such that a complete current path can be formed when depositing metal material on the upper ends of the multiple metal support wires/rods 1720. For example, an electrically conductive paste may be spread on the base 1730 beneath the contoured support frame 1710 such that good electrical contact is made between the wires/rods 1720 and the base 1730. In such an embodiment, the contoured support frame 1710 may be electrically non-conductive. In another embodiment, the contoured support frame 1710 is electrically conductive and is temporarily welded (e.g., tack welded) to the base 1730 (which is electrically conductive). The multiple metal support wires/rods 1720 make electrical contact with the contoured support frame 1710 at the holes/vias such that a complete current path can be formed when depositing metal material on the upper ends of the multiple metal support wires/rods 1720. For example, in accordance with one embodiment, the holes or vias of the contoured support frame 1710 are configured to grip the multiple metal support wires/rods 1720 to make good electrical contact.

As a result, the multiple metal support wires/rods 1720 held by the contoured support frame 1710 act as a negative form to allow, for example, additive manufacturing of a curved or irregular portion of the part above the base 1730. In this manner, and depending on the shape of the contoured support frame and the lengths and angles of the metal support wires/rods sticking out of the contoured support frame, a complex portion of the part can be supported above the base during the additive manufacturing process. Complex and irregular shapes, including multiple curved surfaces, can be additively manufactured in this manner. The contoured support frame 1710 and the multiple metal support wires/rods 1720 can be removed once the part has been additively manufactured. In accordance with one embodiment, multiple parts to be additively manufactured can be supported by the same contoured support frame simply by changing the lengths, angles, and/or numbers (spacing) of the multiple metal support wires/rods (i.e., reconfigure the multiple metal support wires/rods and where they are held by the contoured support frame). In general, the more closely spaced the holes/vias of the contoured support frame and the more angles that are supported by the holes/vias, the more contoured shapes that can be accomplished with that same contoured support frame.

Figure 18:
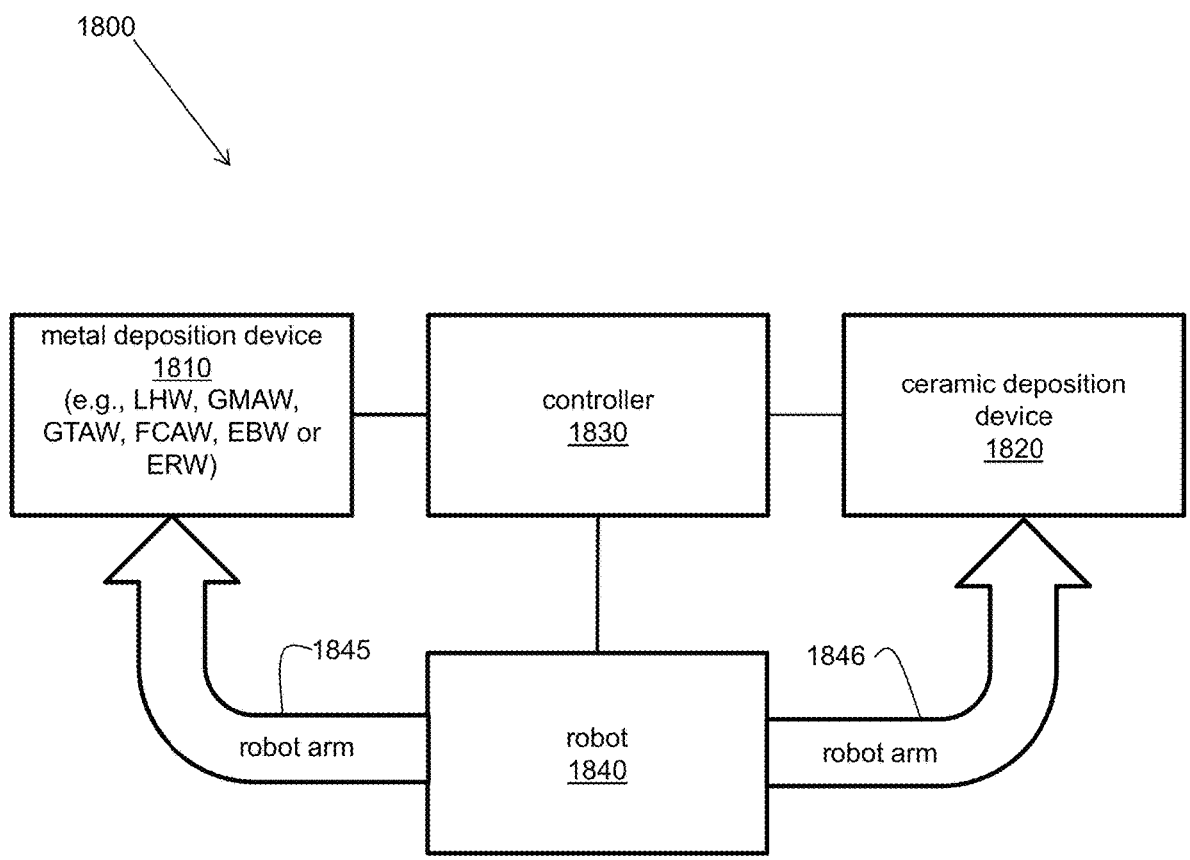
FIG. 18 illustrates a system block diagram of one embodiment of an additive manufacturing system having a metal deposition device and a ceramic deposition device.

FIG. 18 illustrates a system block diagram of one embodiment of an additive manufacturing system 1800 having a metal deposition device 1810 and a ceramic deposition device 1820. The system 1800 also includes a controller 1830 and a robot 1840 having robot arms 1845 and 1846. The ceramic deposition device 1820 is configured to deposit ceramic material during an additive manufacturing process. The term "ceramic material" as used herein may refer to a purely ceramic material, or may refer to a ceramic composite material having more than one type of ceramic material and/or having a ceramic material and a non-ceramic material. The metal deposition device 1810 is configured to deposit molten metal material during the additive manufacturing process. The controller 1830 is operatively coupled to the ceramic deposition device 1820, the metal deposition device 1810, and the robot 1840. That is, in the embodiment of FIG. 18, the controller 1830 is configured to control various aspects of the metal deposition device 1810 (e.g., wire feeding, output power or energy), the ceramic deposition device 1820 (e.g., ceramic material ejection, output power or energy), and to serve as a motion controller for the robot 1840. In accordance with other embodiments, the controller 1830 may include two or more controllers (e.g., a first controller to control the metal deposition device 1810, a second controller to control the ceramic deposition device 1820, and a third controller to control the robot 1840).

In one embodiment, the robot arm 1845 is coupled to the metal deposition device 1810 (or to at least a portion of the metal deposition device 1810 such as a deposition head) such that the robot 1840 can move the metal deposition device 1810 in space, via the arm 1845, relative to a base or substrate under control of the controller 1830. In one embodiment, the robot arm 1846 is coupled to the ceramic deposition device 1820 (or to at least a portion of the ceramic deposition device 1820 such as a deposition head) such that the robot 1840 can move the ceramic deposition device 1820 in space, via the arm 1846, relative to a base or substrate under control of the controller 1830. In another embodiment, the robot arm 1845 is coupled to the base or substrate such that the robot 1840 can move the base or substrate in space, via the arm 1845, relative to the metal deposition device 1810 and/or the ceramic deposition device 1820. The metal deposition device 1810 and the robot 1840 may be of the types shown in FIGS. 1-2 or FIG. 3, for example, in accordance with certain embodiments. Other types of robots and metal deposition devices are possible as well, in accordance with other various embodiments.

In one embodiment, the controller 1830 is configured to command the ceramic deposition device 1820 to deposit the ceramic material on a base during an infill deposition phase of an additive manufacturing process to form a ceramic infill portion of a part. The controller 1830 is also configured to command the metal deposition device 1810 to deposit a metal material onto at least one surface of the ceramic infill portion of the part during a metal shell deposition phase of the additive manufacturing process to form a metal shell portion of the part. In one embodiment, the infill portion of the part has thermal characteristics that enable the infill portion of the part to withstand temperatures produced during the metal shell deposition phase so as not to damage or distort the ceramic infill portion of the part. In one embodiment, the infill portion of the part is electrically conductive (e.g., the ceramic material may be inherently electrically conductive or may be doped with electrically conductive particles). An electrically conductive infill portion of the part facilitates metal deposition via, for example, an arc wire deposition process such that a complete current path can be formed when depositing metal material. In another embodiment, the infill portion of the part is not electrically conductive.

Figure 19A:
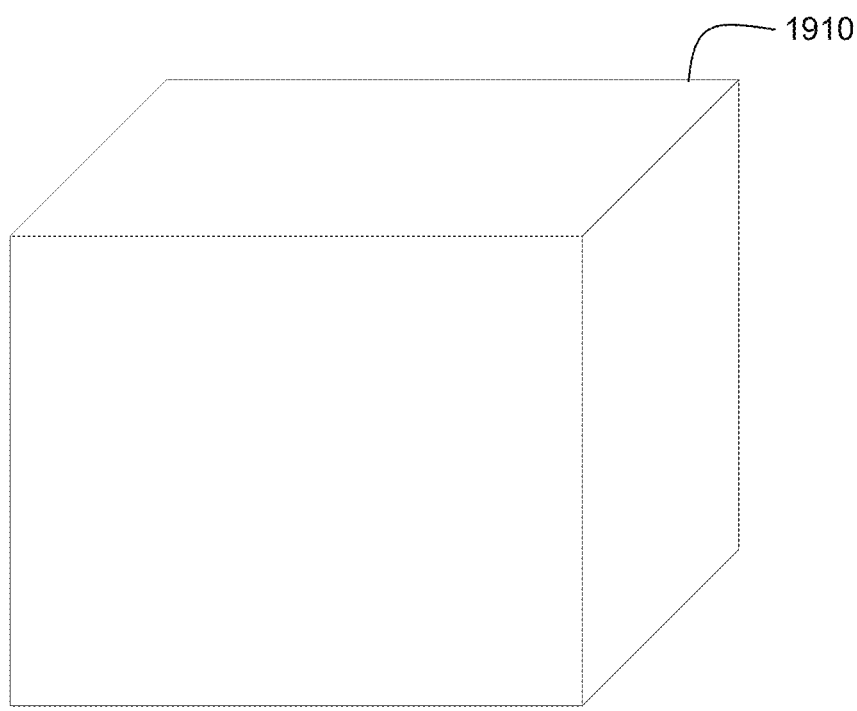
FIGS. 19A-19B graphically illustrate a ceramic infill portion of a part and a metal shell portion of a part created by an additive manufacturing process using the system of FIG. 18.
Figure 19B:
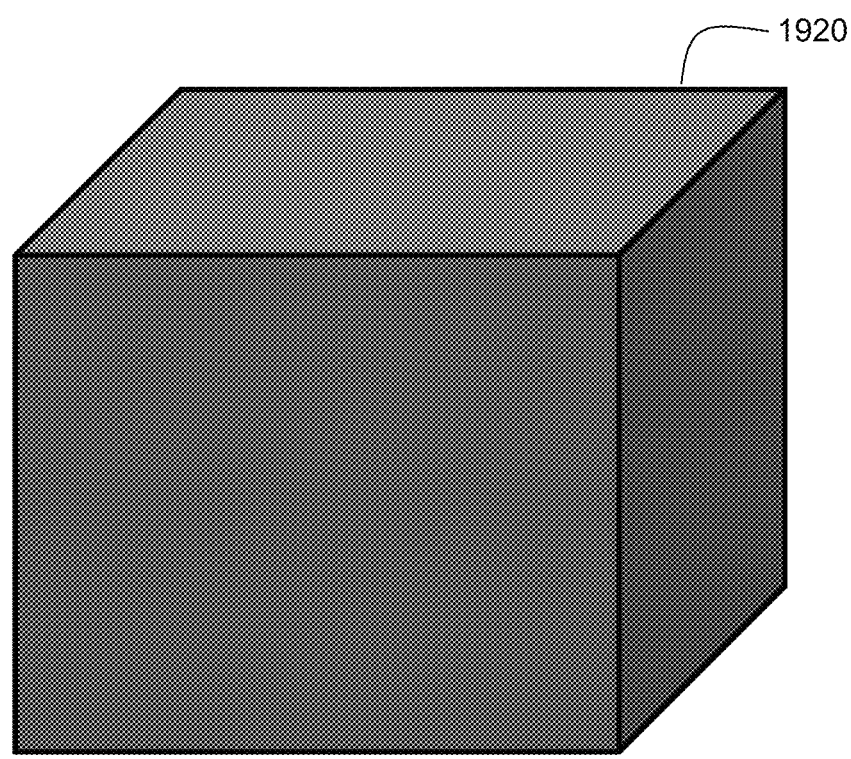

FIGS. 19A-19B graphically illustrate a ceramic infill portion 1910 of a part and a metal shell portion 1920 of a part created by an additive manufacturing process using the system 1800 of FIG. 18. FIG. 19A shows the ceramic infill portion 1910 of the part as being substantially cube-shaped and light in color. FIG. 19B shows the metal shell portion 1920 of the part deposited on at least three sides of the ceramic infill portion 1910 of the part and being dark in color. In one embodiment, the ceramic infill portion 1910 of the part is additively built up layer by layer on a base or substrate to form a solid portion of the part. The base or substrate is then rotated to various orientations (e.g., via the robot 1840 and the robot arm 1845) such that a metal material can be deposited (e.g., via an arc wire deposition process) on surfaces of the ceramic infill portion 1910 of the part by the metal deposition device 1810. The metal material can be deposited as one or more layers, depending on the desired thickness of the metal shell portion 1920 of the part for any particular surface.

In accordance with one embodiment, the ceramic infill portion of the part and the metal shell portion of the part are permanent portions of the part. Using a ceramic material as the infill portion of the part may improve deposition times and/or improve strength and/or thermal characteristics of the final part. In accordance with another embodiment, the metal shell portion of the part is a permanent portion of the part and the ceramic infill portion of the part is a temporary portion of the part acting as a support structure for the metal shell portion of the part during the additive manufacturing process. The ceramic infill portion of the part is configured to be removed from the part to form a final version of the part. The ceramic infill portion of the part can withstand the heat produced during the metal shell deposition phase and can then be removed from the part, for example, by breaking the ceramic out of the final part. In this manner, the ceramic infill portion of the part acts as a negative form of the final part.

Figure 20:
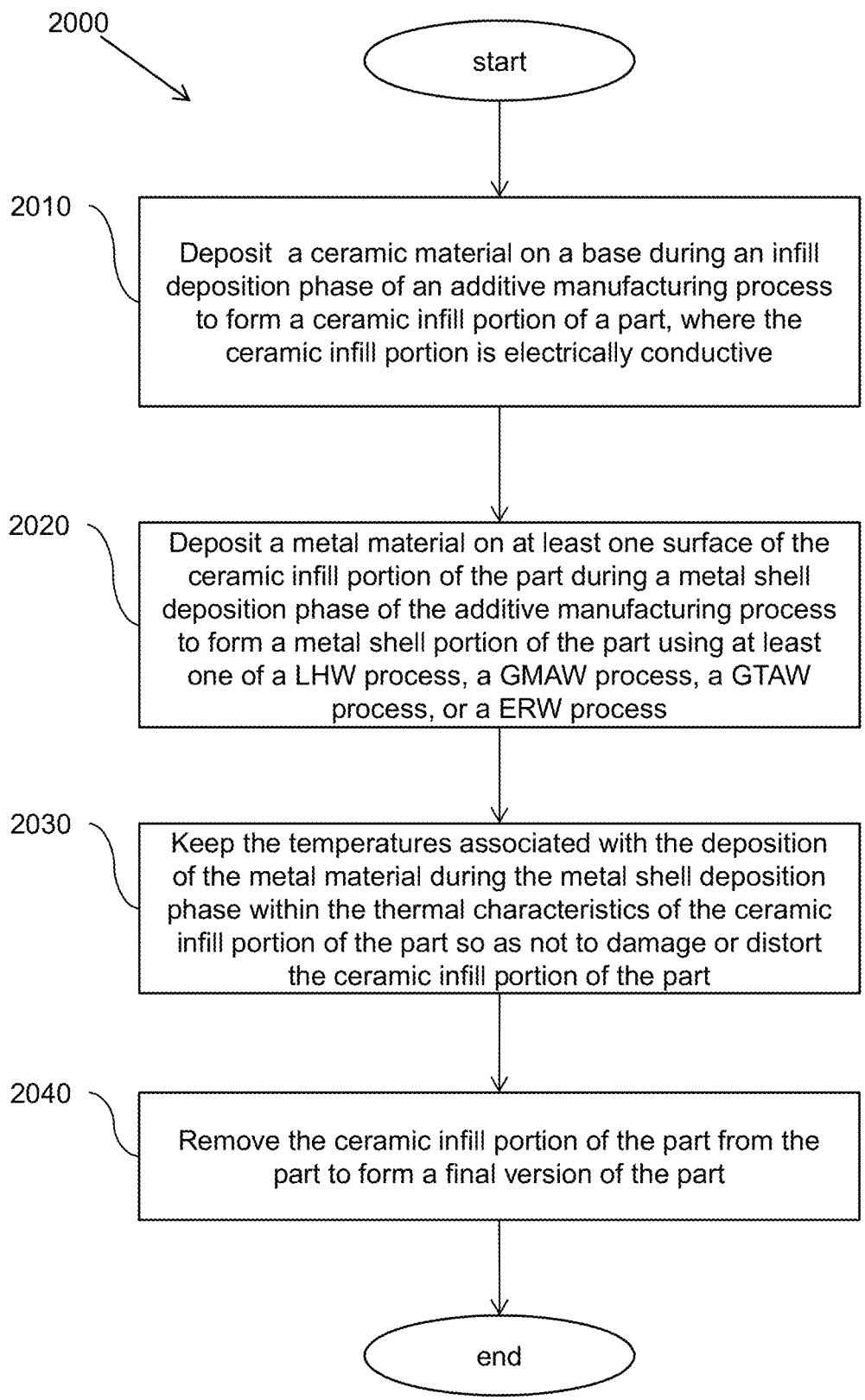
FIG. 20 illustrates a flow chart of one embodiment of a method to additively manufacture a part having a ceramic infill portion and a metal shell portion using the system of FIG. 18.

FIG. 20 illustrates a flow chart of one embodiment of a method 2000 to additively manufacture a part having a ceramic infill portion and a metal shell portion using the system 1800 of FIG. 18. At block 2010 a ceramic material is deposited on a base during an infill deposition phase of an additive manufacturing process to form a ceramic infill portion of a part. The ceramic infill portion of the part may be electrically conductive. For example, the ceramic material before deposition may be infused with electrically conductive particles. Alternatively, the ceramic material may inherently be electrically conductive. In another embodiment, the infill portion of the part is not substantially electrically conductive (e.g., an insulator).

At block 2020, a metal material is deposited on at least one surface of the ceramic infill portion of the part during a metal shell deposition phase of the additive manufacturing process to form a metal shell portion of the part. The metal deposition device uses at least one of a laser hot-wire (LHW) process, a gas metal arc welding (GMAW) process, a gas tungsten arc welding (GTAW) process, a flux-cored arc welding (FCAW) process, an electron beam welding (EBW) process, or an electric resistance welding (ERW) process to deposit the metal material during the metal shell deposition phase of the additive manufacturing process. When the ceramic infill portion of the part is electrically conductive, an electric current can flow through the ceramic infill portion of the part to the conductive base or substrate to facilitate metal deposition for certain processes.

At block 2030, the temperatures associated with the deposition of the metal material during the metal shell deposition phase are kept within the thermal characteristics of the ceramic infill portion of the part so as not to damage or distort the ceramic infill portion of the part. In one embodiment, a temperature sensor senses the temperature of the ceramic infill portion of the part during the metal shell deposition phase and provides a related feedback signal to the controller. The controller is configured to adjust parameters of the metal deposition device to keep the temperature within acceptable limits based on the feedback signal. For example, an output power of the metal deposition device may be reduced and/or a metal deposition rate of the metal deposition device may be reduced. As an option, at block 2040, the ceramic infill portion of the part is removed from the part after metal deposition to form a final version of the part.

Again, the ceramic deposition device 1820 may use motion control (e.g., robotic control), in accordance with one embodiment, to deposit ceramic material onto a substrate or a layer of a 3D part to be additively manufactured under the control of the controller 1830. For example, robotic control may be used to move a depositing head of the ceramic deposition device 1820 and/or the base/substrate on which the 3D part is being additively manufactured, in accordance with various embodiments. Deposit amounts and deposit rates may be precisely controlled, along with dimensions of the deposited ceramic material via the controller 1830. Control of deposit amounts, deposit rates, and deposit dimensions may use various types of controlled devices including, for example, ceramic material delivery nozzles, ceramic material feeders, and vibration-inducing devices. Other configurations of a ceramic deposition device are possible as well, in accordance with other embodiments, to perform the ceramic material deposition functions described herein.

Ceramic materials can be used to additively manufacture a part and can come in different feed-forms and states and can be deposited using various processes. Ceramic materials often come in the form of powders, liquids, or solid materials. Some examples of ceramic materials include $Al_2O_3$, $Al_2O_3$—$B_2O_3$, $Al_2O_3$-glass-$B_2O_3$, $Al_2O_3$—$ZrO_2$—TiC, Apatite-mullite, Graphite, $K_2O$—$Al_2O_3$—$SiO_2$, $SiO_2$, SiC, $ZrO_2$, $ZrB_2$, and glass powder. Ceramic materials can have high temperature mechanical properties that allow the ceramic materials to withstand extreme conditions (e.g., withstand deposition of a molten metal material onto a ceramic surface of a part being additively manufactured).

Additive manufacturing using ceramic material may include processes of, for example, CAD model slicing, printing, debinding, and sintering. The CAD model is a digital model of the part to be additively manufactured. Ceramic structures can be additively manufactured by, for example, direct laser melting of the ceramic material or with the aid of binders and fluidizers. Post-processing at high temperatures may be performed for further densification and burning off of a binder. In general, ceramic materials are poor thermal conductors. For some ceramic materials, a low power laser may be used to melt the ceramic material as part of the deposition process. The output power of a laser may be anywhere from 0.1 watts to 10 kilowatts, for example. The laser may have a wavelength of anywhere from ultraviolet (UV) to mid infra-red (IR), for example, based on the ceramic material, the process, and the type of product being additively manufactured. In accordance with one embodiment, a ceramic material may be heated using microwave energy. In accordance with another embodiment, a ceramic material may be heated using electron beam energy.

Some popular ceramic material additive manufacturing processes include, for example, binder jetting (BJ), material jetting (MJ), powder bed fusion (PBF), sheet lamination (SL), and vat photopolymerization (VP). In binder jetting (BJ), a liquid binder is jet printed onto a layer of powder and a part is constructed layer by layer by binding the particles together. In material jetting (MJ), droplets of a ceramic material are deposited. In powder bed fusion (PBF), thermal energy is used to fuse a region of a powder bed of the ceramic material. In sheet lamination (SL), sheets or foils of ceramic materials are bonded together. In vat photopolymerization (VP), a liquid ceramic material in a vat is light-cured. Another possible additive manufacturing process that may be used with ceramic-based materials is directed energy deposition (DED), where thermal energy is focused to melt the material during deposition. A further possible additive manufacturing process that may be used with ceramic-based materials is material extrusion, where the material is selectively pushed out through a nozzle or orifice during deposition.

In one embodiment, a single-step process may be used to shape a ceramic part. The single-step process may include using, for example, direct energy deposition (DED). Alternatively, the single-step process may include, for example, a selective laser melting (SLM) powder bed fusion process or a selective laser sintering (SLS) powder bed fusion process. Binding of ceramic material particles can be done using chemical binding, solid state sintering, or partial and full melting of the particles, for example. In one embodiment, a multi-step process may be used to create a ceramic part. The multi-step process may include using a binder material to set a shape of a part and then removing the binder via one or more de-binding steps. Binder jetting (BJ), material jetting (MJ), material extrusion (ME), sheet lamination (SL), and vat photopolymerization (VP) are considered to be multi-step processes. Also, some powder bed fusion (PBF) processes are considered to be multi-step processes.

Figure 21:
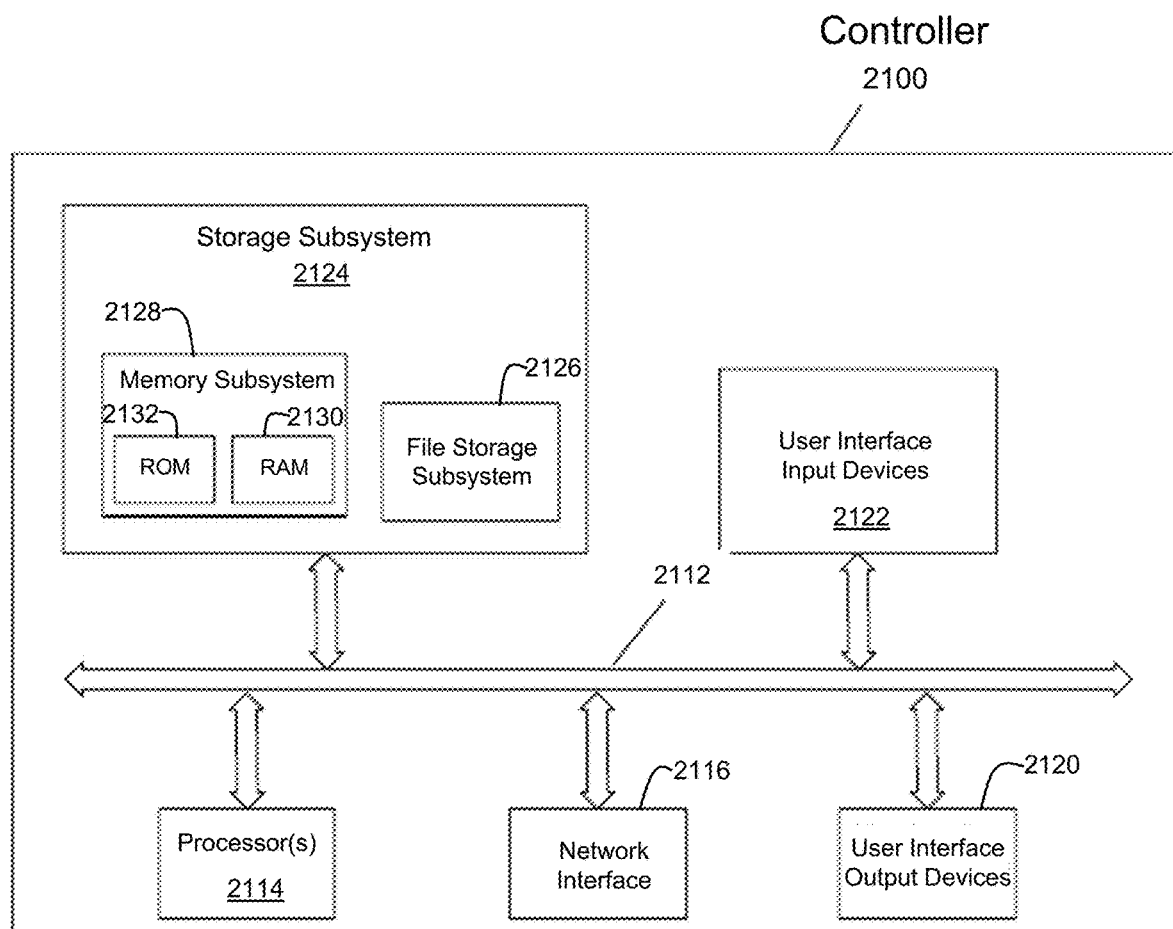
FIG. 21 illustrates an embodiment of an example controller of the additive manufacturing systems of FIGS. 1, 3, 4, 7-11, 14-15, and FIG. 18.

FIG. 21 illustrates an embodiment of an example controller of the additive manufacturing systems of FIGS. 1, 3, 4, 7-11, 14-15, and FIG. 18. The controller 2100 includes at least one processor 2114 which communicates with a number of peripheral devices via bus subsystem 2112. These peripheral devices may include a storage subsystem 2124, including, for example, a memory subsystem 2128 and a file storage subsystem 2126, user interface input devices 2122, user interface output devices 2120, and a network interface subsystem 2116. The input and output devices allow user interaction with the controller 2100. Network interface subsystem 2116 provides an interface to outside networks and is coupled to corresponding interface devices in other computer systems. For example, the motion controller 180 of the apparatus 100 may share one or more characteristics with the controller 2100 and may be, for example, a conventional computer, a digital signal processor, and/or other computing device.

User interface input devices 2122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 2100 or onto a communication network.

User interface output devices 2120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 2100 to the user or to another machine or computer system.

Storage subsystem 2124 stores programming and data constructs that provide or support some or all of the functionality described herein (e.g., as software modules). For example, the storage subsystem 2124 may include a CAD model of a part to be additively manufactured and the logic to identify variations in a deposit location and adjust a metal deposition device to accommodate the identified variations.

Software modules are generally executed by processor 2114 alone or in combination with other processors. Memory 2128 used in the storage subsystem can include a number of memories including a main random access memory (RAM) 2130 for storage of instructions and data during program execution and a read only memory (ROM) 2132 in which fixed instructions are stored. A file storage subsystem 2126 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 2126 in the storage subsystem 2124, or in other machines accessible by the processor(s) 2114.

Bus subsystem 2112 provides a mechanism for letting the various components and subsystems of the controller 2100 communicate with each other as intended. Although bus subsystem 2112 is shown schematically as a single bus, alternative embodiments of the bus subsystem may use multiple buses.

The controller 2100 can be of varying types including a workstation, server, computing cluster, blade server, server farm, or any other data processing system or computing device. Due to the ever-changing nature of computing devices and networks, the description of the controller 2100 depicted in FIG. 21 is intended only as a specific example for purposes of illustrating some embodiments. Many other configurations of the controller 2100 are possible having more or fewer components than the controller depicted in FIG. 21.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. An additive manufacturing system, the system comprising:
   a metal deposition device configured to deposit a metal material during an additive manufacturing process to form a part; and
   a controller operatively coupled to the metal deposition device, wherein the controller is configured to:
      command the metal deposition device to deposit the metal material on a base during a contour deposition phase of the additive manufacturing process to form a contour of the part, command the metal deposition device to deposit the metal material on the base during an infill pattern deposition phase of the additive manufacturing process to form an infill pattern within a region outlined by the contour of the part, wherein the infill pattern is a wave shape having a wavelength, and wherein, during the infill pattern deposition phase, the controller is configured to command the metal deposition device to fuse the metal material of the infill pattern to the metal material of the contour at crossover points, where the infill pattern meets the contour, by applying energy at the crossover points and reducing a deposition rate of the metal material at the crossover points to prevent distorting the contour.

2. The system of claim 1, further comprising a robot that is configured to be controlled by the controller during the additive manufacturing process to move the metal deposition device relative to the base.

3. The system of claim 1, further comprising a robot that is configured to be controlled by the controller during the additive manufacturing process to move the base relative to the metal deposition device.

4. The system of claim 1, wherein the metal deposition device includes:

a wire feeder configured to feed a filler wire of the metal material toward the base;

a power source; and a laser operatively connected to the power source, wherein the power source and the laser are configured to provide energy to melt at least the filler wire during the additive manufacturing process, and wherein the controller is operatively connected to the wire feeder and is configured to: reduce a rate of feeding of the filler wire at the crossover points, or
stop feeding of the filler wire at the crossover points.

5. The system of claim 1, wherein the metal deposition device includes:

a wire feeder configured to feed a filler wire of the metal material toward the base;

a power source; and a non-consumable electrode operatively connected to the power source, wherein the power source and the non-consumable electrode are configured to provide energy to melt at least the filler wire during the additive manufacturing process by forming an arc between the non-consumable electrode and the base, and wherein the controller is operatively connected to the wire feeder and is configured to: reduce a rate of feeding of the filler wire at the crossover points, or
stop feeding of the filler wire at the crossover points.

6. The system of claim 1, wherein the metal deposition device includes:

a first wire feeder configured to feed a filler wire of the metal material toward the base;

a power source; and a second wire feeder operatively connected to the power source and configured to feed a consumable wire electrode of the metal material toward the base, wherein the power source is configured to provide energy to melt at least the consumable wire electrode and the filler wire during the additive manufacturing process by forming an arc between the consumable wire electrode and the base, and wherein the controller is operatively connected to the first wire feeder and is configured to:
reduce a rate of feeding of the filler wire at the crossover points, or stop feeding of the filler wire at the crossover points.

7. The system of claim 1, wherein the metal deposition device includes:

a wire feeder configured to feed a consumable wire electrode of the metal material toward the base; and a power source operatively connected to the wire feeder, wherein the power source is configured to provide energy to melt at least the consumable wire electrode during the additive manufacturing process by forming an arc between the consumable wire electrode and the base, and wherein the controller is operatively connected to the wire feeder and the power source and is configured to:
reduce a rate of feeding of the consumable wire electrode at the crossover points, and/or
reduce the energy provided by the power source to the consumable wire electrode at the crossover points.

8. The system of claim 1, wherein the wave shape is one of a substantially sinusoidal shape, a substantially triangular shape, or a substantially rectangular shape.

9. The system of claim 1, wherein the controller is configured to adjust the wavelength of the wave shape to adjust an infill percentage of the part.

10. The system of claim 1, wherein a deposition rate of the contour deposition phase is less than a deposition rate of the infill pattern deposition phase.

* * * * *